United States Patent
Shimazu et al.

(10) Patent No.: US 7,901,819 B2
(45) Date of Patent: Mar. 8, 2011

(54) HYDROGEN FUEL FEEDING SYSTEM AND FUEL CELL SYSTEM

(75) Inventors: Takashi Shimazu, Nagoya (JP); Hiroshi Aoki, Nagoya (JP); Hiroyuki Mitsui, Nagoya (JP); Satoshi Iguchi, Mishima (JP)

(73) Assignees: Kabushiki Kaisha Toyota Chuo Kenkyusho, Aichi-gun (JP); Toyota Jidosha Kabushiki Kaisha, Toyota-shi (JP)

( * ) Notice: Subject to any disclaimer, the term of this patent is extended or adjusted under 35 U.S.C. 154(b) by 793 days.

(21) Appl. No.: 11/910,373

(22) PCT Filed: Mar. 17, 2006

(86) PCT No.: PCT/JP2006/305899
§ 371 (c)(1),
(2), (4) Date: Oct. 1, 2007

(87) PCT Pub. No.: WO2006/109500
PCT Pub. Date: Oct. 19, 2006

(65) Prior Publication Data
US 2009/0087696 A1    Apr. 2, 2009

(30) Foreign Application Priority Data
Mar. 31, 2005  (JP) .................. 2005-104634

(51) Int. Cl.
*H01M 8/18*  (2006.01)
(52) U.S. Cl. ........................ 429/423; 422/114

(58) Field of Classification Search .................. 429/12, 429/13, 34, 36, 423, 114
See application file for complete search history.

(56) References Cited

U.S. PATENT DOCUMENTS

| | | | |
|---|---|---|---|
| 4,240,805 | A | 12/1980 | Sederquist et al. |
| 2003/0190503 | A1 | 10/2003 | Kumar et al. |
| 2003/0235529 | A1 | 12/2003 | Hershkowitz et al. |
| 2004/0170558 | A1 | 9/2004 | Hershkowitz et al. |
| 2004/0170559 | A1* | 9/2004 | Hershkowitz et al. ........ 423/652 |
| 2004/0175326 | A1 | 9/2004 | Hershkowitz et al. |

FOREIGN PATENT DOCUMENTS

| | | |
|---|---|---|
| JP | 2003 151599 | 5/2003 |
| JP | 2003 335503 | 11/2003 |
| JP | 2004 146337 | 5/2004 |

* cited by examiner

*Primary Examiner* — Jennifer Michener
*Assistant Examiner* — Monique Wills
(74) *Attorney, Agent, or Firm* — Oblon, Spivak, McClelland, Maier & Neustadt, L.L.P.

(57) ABSTRACT

A hydrogen fuel feeding system of a fuel cell system that has: a switching device for switching a reactor, that can carry out a reforming process and a regeneration process, between alternate statuses of a first status of feeding a reactant to the reactor while exhausting a fuel gas and a second status of feeding a gas for regeneration to the reactor while exhausting a regeneration exhaust gas; and a control apparatus for switching the switching device so that residual reforming gas, which is still remaining in the reactor before switching, is combusted in an exhaust air processor and not exhausted as the residual reforming gas without treatment when switching from the first status to the second status.

24 Claims, 20 Drawing Sheets

FIG.6

HYDROGEN FUEL FEEDING SYSTEM AND FUEL CELL SYSTEM

BACKGROUND OF THE INVENTION

1. Field of the Invention

The present invention relates to a hydrogen fuel feeding system for, for example, feeding a fuel gas containing hydrogen to a fuel cell and a fuel cell system that is provided with this hydrogen fuel feeding system.

2. Description of the Related Art

As a hydrogen fuel feeding system for feeding a fuel gas containing hydrogen to a fuel cell, a system for performing cyclic hydrocarbon reforming which alternately repeats a reforming process, to generate a hydrogen containing gas by reacting a hydrocarbon fuel with steam, and a regeneration process, for raising a catalyst temperature that is lowered in the reforming process, has been known (for example, refer to US Patent Application Publication No. 2004/0170559A). The system described in this document is provided with a pair of reactors that can perform the reforming process and the regeneration process. This system continuously feeds a hydrogen containing gas to a fuel cell by performing batch hydrocarbon reforming, where one reactor performs the reforming process while the other reactor performs the regeneration process. After the reforming process, shift reaction and hydrogen separation are performed to feed a hydrogen-rich fuel to a fuel cell. Also, purge gas passed through a hydrogen separator is used as a gas for regeneration (a fuel) of the regeneration process without being fed to the fuel cell. A cathode-off gas (an oxygen-containing gas) of the fuel cell is introduced into the reactor performing the regeneration process for combusting the purge gas so as to raise a catalyst to a temperature at which the reforming process can be performed, by combustion of the purge gas.

However, according to the above-described conventional art, the processing of the gas remaining in the reactor upon switching from the reforming process to the regeneration process, or upon switching from the regeneration process to the reforming process has not been considered.

SUMMARY OF THE INVENTION

Therefore, the present invention has been made taking the foregoing circumstances into consideration and provides a hydrogen fuel feeding system and a fuel cell system, which can effectively process the residual gas in a reactor upon switching from a reforming process to a regeneration process or from a regeneration process to a reforming process.

A first aspect of the present invention provides a hydrogen fuel feeding system including: a reactor that can be switched so as to carry out a reforming process, for generating a fuel gas containing hydrogen from a reactant, and a regeneration process for raising to a temperature at which a reforming reaction can be performed a temperature lowered by the reforming process by reacting the fed gas for regeneration; a switching device for switching alternately between a first status of feeding the reactant to the reactor while exhausting the fuel gas and a second status of feeding the gas for regeneration to the reactor while exhausting a regeneration exhaust gas; and a control apparatus for switching the switching device so that when switching from the first status to the second status residual reforming gas remaining in the reactor before switching is not exhausted without treatment as the residual reforming gas.

A second aspect of the present invention provides a hydrogen fuel feeding system including: a reactor that can be switched so as to carry out a reforming process for generating a fuel gas containing hydrogen from a reactant and a regeneration process for raising to a temperature at which a reforming reaction can be performed a temperature within the reactor, which was lowered by the reforming process, by reacting a fed gas for regeneration; a switching device for switching to configure alternate statuses of a first status of feeding the reactant to the reactor while exhausting the fuel gas and a second status of feeding the gas for regeneration to the reactor while exhausting a regeneration exhaust gas; and a control apparatus for switching the switching device so that when switching from the second status to the first status residual regeneration gas remaining in the reactor before switching is not fed without treatment to the feeding destination of the fuel gas.

A third aspect of the present invention provides a fuel cell system including a hydrogen fuel feeding system and a fuel cell wherein the hydrogen fuel feeding system includes: a reactor that can be switched so as to carry out a reforming process for generating a fuel gas containing hydrogen from a reactant and a regeneration process for raising a temperature, lowered by the reforming process, by reacting the fed gas for regeneration to a temperature at which a reforming reaction can be performed; a switching device for switching configuration alternately between of a first status feeding the reactant to the reactor while exhausting the fuel gas and a second status of feeding the gas for regeneration to the reactor so that these two statuses are alternately generated to exhaust a regeneration exhaust gas; and a control apparatus for switching the switching device so that when switching the first status into the second status residual reforming gas remaining in the reactor before switching is not exhausted without treatment as the residual reforming gas; and the fuel cell consumes hydrogen gas in the fuel gas generated by the hydrogen fuel feeding system in the reforming process and generates electric power; wherein the fuel cell system uses exhaust fuel gas that is exhausted from the fuel cell as the gas for regeneration.

A fourth aspect of the present invention provides fuel cell system including a hydrogen fuel feeding system and a fuel cell wherein the hydrogen fuel feeding system includes: a reactor that can be switched so as to carry out a reforming process for generating a fuel gas containing hydrogen from a reactant and a regeneration process for raising a temperature lowered by the reforming process to a temperature at which the reforming reaction can be performed by reacting the fed gas for regeneration; a switching device for switching alternately between the configurations of a first status of feeding the reactant to the reactor while exhausting the fuel gas and a second status of feeding the gas for regeneration to the reactor while exhausting a regeneration exhaust gas; and a control apparatus for switching the switching device so that when switching the second status into the first status residual regeneration gas remaining in the reactor before switching is not fed to a feeding destination of the fuel gas without treatment as the residual regeneration gas; and the fuel cell consumes hydrogen gas in the fuel gases generated by the hydrogen fuel feeding system in the reforming process and generates electric power; wherein the fuel cell system uses exhaust fuel gas that is exhausted from the fuel cell as the gas for regeneration.

Other aspects, features and advantages of the present invention will become apparent from the following description taken in conjunction with the accompanying drawings.

BRIEF DESCRIPTION OF THE DRAWINGS

FIG. 6 is a system block diagram showing the other of the basic operations common to the fuel cell system according to embodiments of the present invention;

DESCRIPTION OF THE PREFERRED EMBODIMENTS

With reference to the drawings, a fuel cell system 10 according to the embodiments of the present invention will be described below. At first, the basic configuration and the basic operation common to each embodiment of the present invention will be described, and then, each embodiment will be described in detail.

<Basic Configuration>

Figure 2:
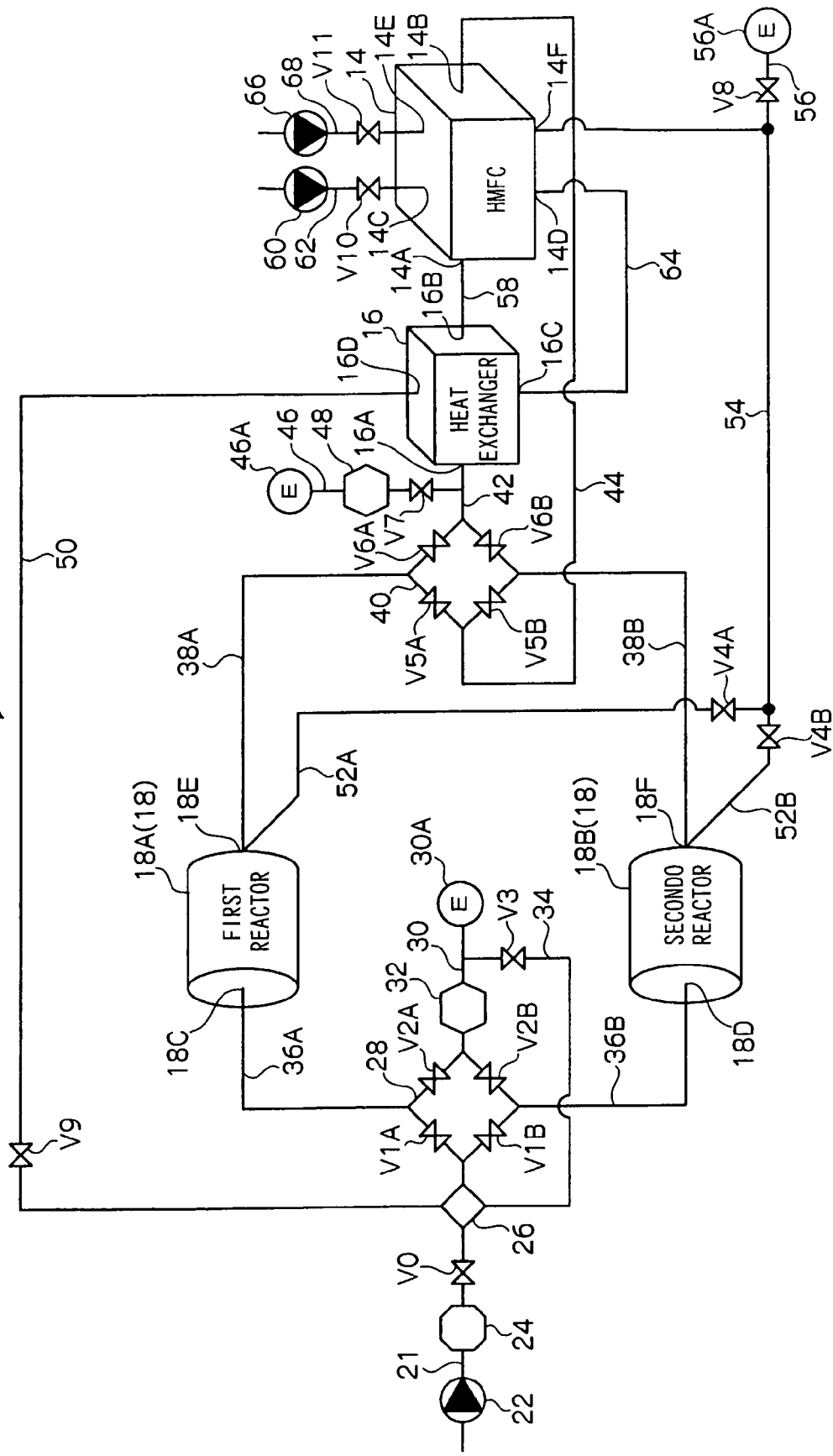
FIG. 2 is a system block diagram showing a basic configuration common to a fuel cell system according to embodiments of the present invention.

FIG. 2 is a system block diagram (a system flow sheet) showing the fuel cell system 10 that is the basic configuration of fuel cell systems 10A to 10L according to the embodiments of the present invention. As shown in the drawing, the fuel cell system 10 is configured by major component parts, such as a hydrogen fuel feeding system 12, a fuel cell 14 that performs generation of electric power being fed with hydrogen fuel from the hydrogen fuel feeding system 12, and a heat exchanger 16 that performs heat exchange between the hydrogen fuel feeding system 12 and the fuel cell.

The hydrogen fuel feeding system 12 is provided with a pair of reactors 18. In each of the pair of reactors 18, a reforming catalyst (not illustrated) is arranged inside a housing that is formed in the shape of a tube. Each of the pair of reactors 18 is configured so as to generate a fuel gas including hydrogen gas by catalyzing respectively fed gases of a hydrocarbon gas (gasoline, methanol, natural gas or the like) with a gas for reforming (steam, oxygen) (perform a reforming reaction). The reforming reaction may include each reaction represented by the following equations (1) to (4). Accordingly, the fuel gas obtained in the reforming process contains combustible gas(es), such as hydrogen ($H_2$), carbon monoxide (CO), methane ($CH_4$), cracked hydrocarbon, and unreacted reactant hydrocarbon ($C_xH_y$) or the like, and noncombustible gas(es) such as carbon dioxide ($CO_2$) and water ($H_2O$) or the like.

$$C_nH_m + nH_2O \rightarrow nCO + (n+m/2)H_2 \quad (1)$$

$$C_nH_m + n/2O_2 \rightarrow nCO + m/2H_2 \quad (2)$$

$$CO + H_2O \leftrightarrow CO_2 + H_2 \quad (3)$$

$$CO + 3H_2 \leftrightarrow CH_4 + H_2O \quad (4)$$

This reforming reaction takes place at or above a predetermined temperature (700° C. in the present embodiment). Then each reactor 18, separately from the reforming reaction, performs a regeneration reaction to heat the catalyst by reacting respectively fed gases of a gas for regeneration with oxygen gas, in order to raise the catalyst temperature that is lowered by the reforming reaction and to accumulate heat in the catalyst. According to this embodiment, by combusting the gas for regeneration (an anode-off gas to be described later), the temperature of the catalyst of each reactor 18 is raised to a temperature at which the above-described reforming reaction of the catalyst can be performed. Accordingly, each reactor 18 is configured so as to be capable of selectively performing the reforming reaction and the regeneration reaction.

The fuel cell 14 is configured so as to generate electric power by electrochemically reacting the fuel gas obtained by the reforming reaction (the gas containing hydrogen, carbon monoxide, and unreacted hydrocarbon), fed from the hydrogen fuel feeding system 12 to an anode electrode (a hydrogen electrode), with oxygen fed to a cathode electrode (an oxygen electrode). According to this embodiment, the fuel cell 14 is a hydrogen separation membrane fuel cell (HMFC) having a hydrogen separation film arranged between the anode electrode and the cathode electrode. Only the hydrogen in the fuel gas permeated across the hydrogen separation film is reacted with the oxygen of the cathode electrode (namely, only hydrogen in the fuel gas is used for generation of electric power). Therefore, the anode-off gas of the fuel cell 14 is a combustible gas mainly of a mixture of carbon monoxide and hydrocarbons (it may also contain hydrogen). On the other hand, the cathode-off gas of the fuel cell 14 is air containing water (steam), generated by the reaction of oxygen and hydrogen, and oxygen.

Next, the flows of various gases will be described. In the fuel cell system 10, the anode-off gas is used as the gas for regeneration of the reactors 18. In addition, in the fuel cell system 10, steam and oxygen contained in the cathode-off gas are reacted with the hydrocarbon gas that is the reforming reaction gas as described in the above equations (1) and (2). Further, the fuel cell 14 is configured so as to be cooled by air for cooling in order to keep its reaction temperature approximately constant (in this embodiment, about 500° C.). The air for cooling, the temperature of which has been raised by cooling the fuel cell 14, is used as a combustion-supporting gas (oxygen) for the regeneration reaction. Accordingly, the fuel cell system 10 basically functions by feeding only a hydrocarbon reactant, and air for the cathode and for cooling.

The heat exchanger 16 carries out heat exchange between a high temperature gas (700° C.) of the fuel gas to be fed to the anode electrode of the fuel cell 14, and a low temperature gas (500° C.) of the cathode-off gas, so as to improve the heat efficiency of the fuel cell system.

The hydrogen fuel feeding system 12 is provided with a switching device 20 for switching the channels of the reforming reaction gas (hydrocarbon gas, steam, and oxygen) for a pair of reactors 18, fuel gas generated by the reforming reaction, gas for regeneration (the anode-off gas, air for cooling), and regeneration and exhaust gas. In the following description, when distinguishing between the two reactors 18, the one reactor 18 shown at the upper part of each drawing is designated as a first reactor 18A and the other reactor 18 is designated as a second reactor 18B.

The switching device 20 is configured so as to switch between: a status of carrying out the regeneration reaction by feeding the gas for regeneration and oxygen to the second reactor 18B, during which time the reforming reaction gas is fed to the first reactor 18A to perform the reforming reaction; and, a status of carrying out the reforming reaction by feeding the gas for reforming to the second reactor 18B, during which time the gas for regeneration and oxygen are fed to the first reactor 18A to perform the regeneration reaction. Hereinafter, a specific example of the configuration of switching device 20 will be described. In the following description, the status (the period) in which a reactor 18 carries out the reforming reaction may be referred to as a reforming process, and the status (the period) in which a reactor 18 carries out the regeneration reaction may be referred to as a regeneration process.

As shown in FIG. 2, the hydrogen fuel feeding system 12 is provided with a material feeding line 21, and on the material feeding line 21, a fuel pump 22, for feeding a liquid hydrocarbon reactant from a fuel tank (not illustrated), is arranged. Downstream of the fuel pump 22 in the material feeding line 21, an evaporator (carburetor) 24 is disposed to evaporate the hydrocarbon reactant by, for example, heat exchange with the exhaust gas of the fuel cell system 10. In addition, downstream of the evaporator 24 in the material feeding line 21, a mixer 26 is arranged, mixing the hydrocarbon fuel with the cathode-off gas (steam of the equation (1) and oxygen of the equation (2)) to be described later, the mixer 26 exhausting the mixture downstream as the reforming reaction gas. Further, since the cathode-off gas is at a high temperature, it is also possible to configure hydrogen fuel feeding system 12 without the evaporator 24 by adopting a configuration to inject the liquid hydrocarbon reactant in the mixer 26 (injection configuration). Further, between the evaporator 24 and the mixer 26, a valve V0 as hydrocarbon reactant cutoff unit is disposed.

At the downstream end of the material feeding line 21, a bridge conduit 28 is connected. In each drawing, four valves V1A, V1B, V2B, and V2A are arranged in series in this bridge conduit 28 in an anticlockwise direction in this order. The downstream end of the material feeding line 21 is connected between the valve 1A and the valve 1B in the bridge conduit 28. The upstream end of an exhaust line 30 is connected between the valve 2A and the valve V2B in the bridge conduit 28. On the exhaust line 30, an exhaust air processor 32 is arranged in the exhaust line 30. This exhaust air processor 32 is configured with an oxide catalyst incorporated in a housing so as to perform oxidation treatment (purification) of the gas for regeneration that does not combust in the regeneration reaction. At the downstream end of the exhaust line 30 is an exhaust port 30A. In addition, an exhaust return line 34 is branched from downstream of the exhaust air processor 32 and the exhaust return line 34 is connected to the mixer 26, enabling the exhaust to be introduced into the mixer 26. The valve V3 is disposed in the exhaust return line 34. It is not necessary for the fuel cell system 10 according to this basic configuration to include the exhaust air processor 32.

In addition, between the valve V1A and the valve V2A in the bridge conduit 28, the other end of a first line 36A, of which one end is connected to a first port 18C of the first reactor 18A, is connected. Further, between the valve V1B and the valve V2B in the bridge conduit 28, the other end of a second line 36B, of which one end is connected to a first port 18D of the second reactor 18B, is connected. The first line 36A and the second line 36B are selectively used for: feeding the reforming reaction gas to, respectively, the first reactor 18A and the second reactor 18B that carry out the reforming reaction; and, for discharging the regeneration exhaust gas from the, respectively, first reactor 18A and the second reactor 18B, that carry out the regeneration reaction.

Further, at a second port 18E disposed at the opposite side (the opposite side in the gas flow direction) to the first port 18C in the first reactor 18A, one end of a third line 38A is connected, and at a second port 18F disposed at the opposite side to the first port 18D in the second reactor 18B, one end of a fourth line 38B is connected. Each of other ends of the third line 38A and the fourth line 38B is connected to a bridge conduit 40. In each drawing, four valves V5A, V5B, V6B, and V6A are arranged in series in this bridge conduit 40 in the anticlockwise direction in this order. The other end of the third line 38A is connected between the valve V5A and the valve V6A in the bridge conduit 40, and the other end of the fourth line 38B is connected between the valve V5B and the valve V6B in the bridge conduit 40.

Between the valve V6A and the valve V6B of this bridge conduit 40, one end of a fuel gas feeding line 42 is connected. The other end of the fuel gas feeding line 42 is connected to a high temperature gas inlet 16A of the heat exchanger 16 (a fuel gas inlet 14A of the fuel cell 14). In addition, between the valve V5A and the valve V5B in the bridge conduit 40, one end of a gas for regeneration introduction line 44 is connected. The other end of the gas for regeneration introduction line 44 is connected an anode-off gas outlet 14B of the fuel cell 14.

In addition, from the fuel gas feeding line 42 is branched an exhaust line 46, at the downstream end of which is an exhaust port 46A, and on the exhaust line 46, an exhaust air processor 48 is arranged. This exhaust air processor 48 is configured with an oxide catalyst incorporated in a housing, and basically the exhaust air processor 48 purifies the exhaust gas (the combustion gas) at start-up of the hydrogen fuel feeding system 12. Upstream of the exhaust air processor 48 on the exhaust line 46, is arranged the valve V7.

Further, the switching device 20 is provided with a steam feeding line 50, one end of which is connected to the mixer 26, for feeding steam and oxygen to the mixer 26. The other end of the steam feeding line 50 is connected to a low temperature gas outlet 16D of the heat exchanger 16 so as to feed the cathode-off gas of the fuel cell 14 to the mixer 26. On the steam feeding line 50, is arranged the valve V9.

In addition, the switching device 20 is provided with a combustion air feeding line 52A, one end of which is connected to the end of the second port 18E in the first reactor 18A, and a combustion air feeding line 52B, one end of which is connected to the end of the second port 18F in the second reactor 18B. On the combustion air feeding line 52A, is disposed the valve V4A, and on the combustion air feeding line 52B, is disposed the valve V4B. Each of other ends of the combustion air feeding lines 52A and 52B (the upstream end) is connected to the other end of a cooling air exhaust line 54 connected to a cooling air outlet 14F of the fuel cell 14.

From the cooling air exhaust line 54 is branched an exhaust line 56, of which the downstream end is an exhaust port 56A, and on the exhaust line 56, is arranged the valve V8. The valve V8 is configured so as to be able to have various degrees of valve opening, and depending on this valve opening degree, the exhaust amount of the exhaust line 56, that is to say the feed amount of combustion air to be fed to the reactor 18 through the combustion air feeding lines 52A and 52B, can be adjusted.

The above-described switching device 20 may: switch a channel of the reforming reaction gas (hydrocarbon, steam, and oxygen) to the pair of reactors 18 depending on opening and closing of the valves V1A and V1B; may switch a channel of the fuel gas generated by the reforming reaction depending on opening or closing of the valves V6A and V6B; may switch a channel of the combustion air depending on opening and closing of the valves V4A and V4B; and may switch a channel of the exhaust gas for regeneration depending on opening and closing of the valves V2A and V2B. Each valve is an electromagnetic valve and each valve is configured so as to open and close (adjustment of the valve opening degree in the case of the valve V8) based on actuation signals from a control apparatus 90 to be described later. The switching operation due to opening and closing of the switching device 20, namely, the specific operation of the hydrogen fuel feeding system 12 will be described later as a basic operation of the fuel cell system 10.

The fuel gas inlet 14A of the fuel cell 14 is connected to a high temperature gas inlet 16B of the heat exchanger 16 by a fuel gas line 58. Thereby, fuel gas which passes from the reactor 18 for carrying out the reforming process, through the third line 38A or the fourth line 38B, the valve 6A or the valve V6B of the bridge conduit 40, the fuel gas feeding line 42, the high temperature gas channel in the heat exchanger 16, and the fuel gas line 58 is fed to the fuel gas inlet 14A of the fuel cell 14. The fuel gas introduced from the fuel gas inlet 14A into the fuel cell 14 is fed to the anode electrode and, as described above, and only the hydrogen gas is used for generation of electric power. The residual combustible gas components are exhausted from the anode-off gas outlet 14B of the fuel cell 14 as the anode-off gas. The anode-off gas is fed to the reactor 18 as the gas for regeneration through the gas for regeneration introduction line 44, the valve V5A or the valve V5B, and the third line 38A or the fourth line 38B.

In addition, to a cathode air inlet 14C of the fuel cell 14, the other end of a cathode air feeding line 62 of which one end is connected to the exhaust side of an air pump 60 is connected. On the cathode air feeding line 62, is arranged a valve V10. Air (oxygen) introduced from the cathode air inlet 14C into the fuel cell 14 is introduced into the cathode electrode to be reacted with hydrogen permeated through the hydrogen separation membrane as described above. Steam generated by this reaction and the unreacted air are exhausted from a cathode-off gas outlet 14D as the cathode-off gas.

The cathode-off gas outlet 14D of the fuel cell 14 and a low temperature gas inlet 16C are connected through a low temperature gas line 64. Accordingly, the cathode-off gas exhausted from the cathode-off gas outlet 14D is introduced into the mixer 26 through the low temperature gas line 64, the low temperature gas channel in the heat exchanger 16, and the steam feeding line 50 to be mixed with the hydrocarbon reactant in the mixer 26. Then, this mixed gas is fed to a reactor 18 as the reforming reaction gas through the material feeding line 21, the valve V1A or the valve V1B of the bridge conduit 28, and the first line 36A or the second line 36B.

Further, to a cooling air inlet 14E of the fuel cell 14 is connected the other end of a cooling air feeding line 68, one end of which is connected to the exhaust side of an air pump 66. On the cooling air feeding line 68, is disposed a valve V11. Air introduced from the cooling air inlet 14E into the fuel cell 14 cools this fuel cell 14 while flowing in a cooling air channel (not illustrated) so as to keep the temperature of operation approximately constant. After cooling the fuel cell 14 the cooling air is exhausted from the cooling air outlet 14F so as to be fed to the reactor 18 as the combustion-supporting gas of the regeneration process through the cooling air exhaust line 54, the combustion air feeding line 52A or the combustion air feeding line 52B.

The regeneration exhaust gas (the combustion gas) generated in the regeneration process is exhausted from the exhaust port 30A to the outside through the first line 36A or the second line 36B, the valve V2A or the valve V2B of the bridge conduit 28, and the exhaust line 30.

Figure 3:
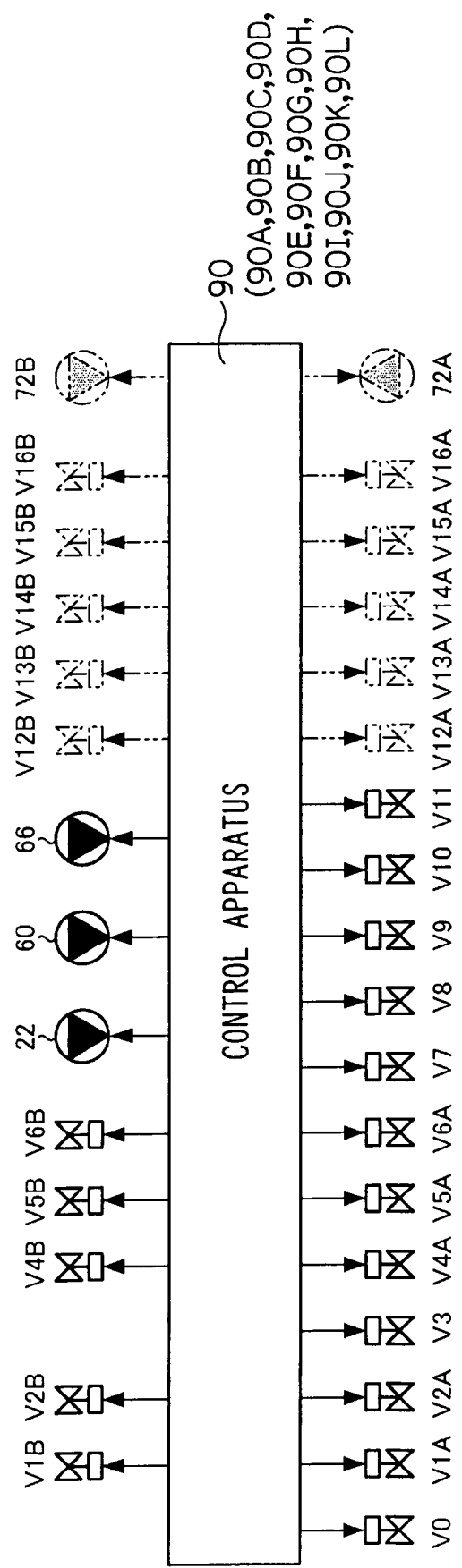
FIG. 3 is a block diagram showing a schematic configuration of a control apparatus showing a fuel cell system according to embodiments of the present invention.

In addition, the fuel cell system 10 is provided with the control apparatus 90. As shown in FIG. 3, the control apparatus 90 is electrically connected to each valve of the switching device 20 (the valves V0, V1A, V1B, V2A, V2B, V3, V4A, V4B, V5A; V5B, V6A, V6B, V7, V8, and V9), respective valves V10 and V11 for feeding air to the fuel cell 14, the fuel pump 22, and respective air pumps 60 and 66. The fuel cell system 10 may open and close each valve (adjustment of the degree of valve opening in the case of the valve V8) and may activate and stop each pump (control the feeding amount of fuel and air). Further, each of the valves and air pumps shown by dotted lines can additionally be provided in each of the embodiments described later, and they are electrically connected to the control apparatus 90 so as to be controlled. This control apparatus 90 is configured to carry out the operation as shown in the flow chart of FIG. 4. This operation will be described together with the basic operation of the fuel cell system 10.

<Basic Operation>

Figure 5:
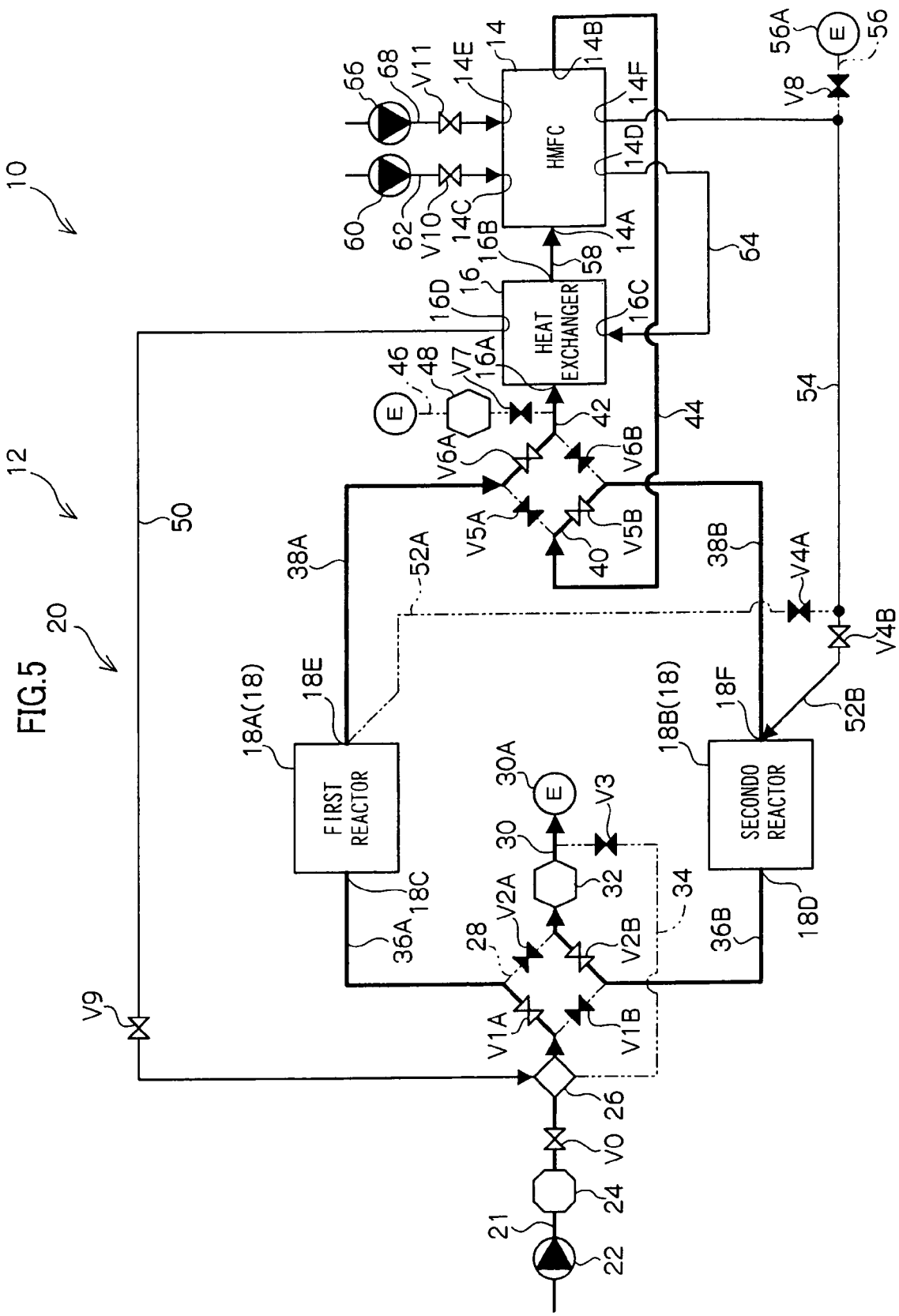
FIG. 5 is a system block diagram showing one of the basic operations common to the fuel cell system according to embodiments of the present invention.
Figure 6:
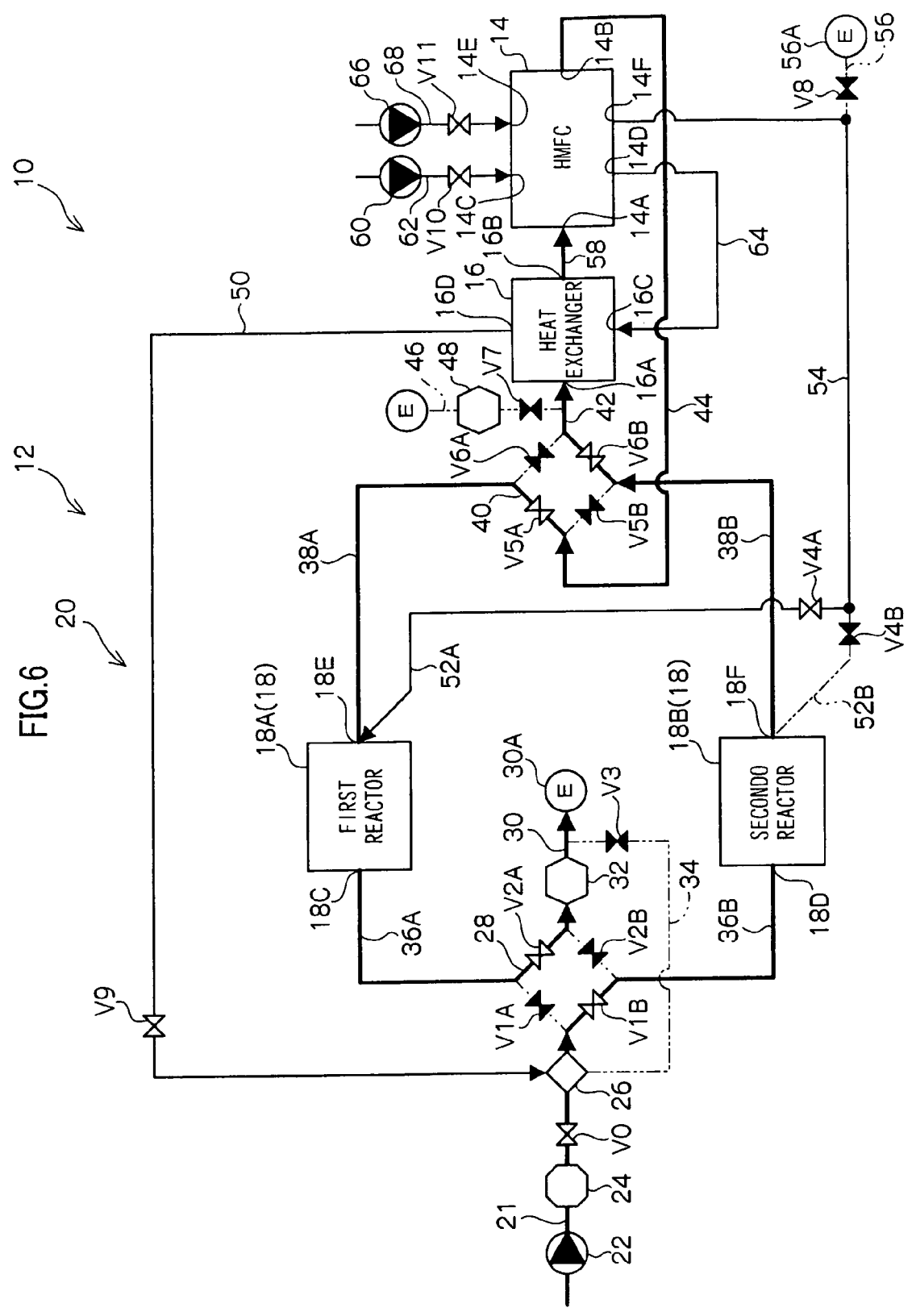

Next, the basic driving operation of the fuel cell system 10 will be described. FIG. 5 is a system block diagram showing a status in which the first reactor 18A is carrying out the reforming process and the second reactor 18B is carrying out the regeneration process, and FIG. 6 is a system block diagram showing a status at which the first reactor 18A is carrying out the regeneration process and the second reactor 18B is carrying out the reforming process. Further, in each drawing showing the operation of the fuel cell system 10, open valves are represented by an outline and closed valves are represented by solid black, and channels in which the flowing of a fluid is cut off with a closed valve are represented by dotted lines.

In the status shown in FIG. 5, the valves V0, V1A, V2A, V4B, V5B, V6A, V9, V10, and V11 are open. On the other hand, the valves V1B, V2A, V4A, V5A, and V6B are closed. Thereby, the hydrocarbon reactant is fed to the mixer 26 via the material feeding line 21 (the valve V0) and then, the hydrocarbon reactant is mixed with air (oxygen) in the mixer 26 to make the reforming reaction gas. The reforming reaction gas exhausted from the mixer 26 is fed into the first reactor 18A via the bridge conduit 28 (the valve V1A) and the first line 36A. In the first reactor 18A, the reforming reactions of the above equations (1) and (2) are carried out by contact of the catalyst with the reforming reaction gas, and then, the fuel gas is generated, containing hydrogen, carbon monoxide and the like.

This fuel gas is introduced into the heat exchanger 16 via the third line 38A and the bridge conduit 40 (the valve V6A), and then, the fuel gas exchanges heat with the cathode-off gas, the gas for reforming to be cooled in this heat exchanger 16. The cooled fuel gas is introduced into the anode electrode in the fuel cell 14 via the fuel gas line 58, and the fuel gas inlet 14A of the fuel cell 14. In the fuel cell 14, air, namely, oxygen is continuously fed to the cathode electrode via the cathode air feeding line 62 and the cathode air inlet 14C. From the anode electrode, only hydrogen passes through the hydrogen separation membrane and the hydrogen is made into protons and moves to the cathode electrode. Electric power is generated by the reaction of this hydrogen with the oxygen fed to the cathode electrode. In addition, in the fuel cell 14, cooling air is continuously fed to the fuel cell 14 through the cooling air feeding line 68 and the cooling air inlet 14E and the operation temperature is kept at approximately 500° C.

The cathode-off gas containing steam and oxygen exhausted from the cathode-off gas outlet 14D of the fuel cell 14 is introduced to the low temperature gas channel of the heat exchanger 16 and this cathode-off gas exchanges heat with the fuel gas to be introduced into the anode electrode as described above. After that, this cathode-off gas is introduced into the mixer 26 via the steam feeding line 50 and is mixed with the hydrocarbon reactant as described. Then, the cathode-off gas is made into the reforming reaction gas to be introduced into the first reactor 18A.

The anode-off gas containing carbon monoxide and hydrocarbon reactant exhausted from the anode-off gas outlet 14B of the fuel cell 14 is introduced into the second reactor 18B via the gas for regeneration introduction line 44, the bridge conduit 40 (the valve V5B), and the fourth line 38B. On the other hand, the cooling air exhausted from the cooling air outlet 14F of the fuel cell 14 is introduced into the second reactor 18B via the cooling air exhaust line 54 and the combustion air feeding line 52B (the valve V4B). In this second reactor 18B, the anode-off gas as the combustible gas that contacts the catalyst, combusts together with the cooling air containing oxygen as the combustion-supporting gas. Thereby, the catalyst temperature of the second reactor 18B rises to a temperature at which the reforming reaction can be made and the heat necessary for reforming is accumulated. The regeneration exhaust gas, as the combustion gas generated by this combusting, is exhausted to the outside of the system via the second line 36B, the bridge conduit 28 (the valve V2B), and the exhaust line 30.

Figure 4:
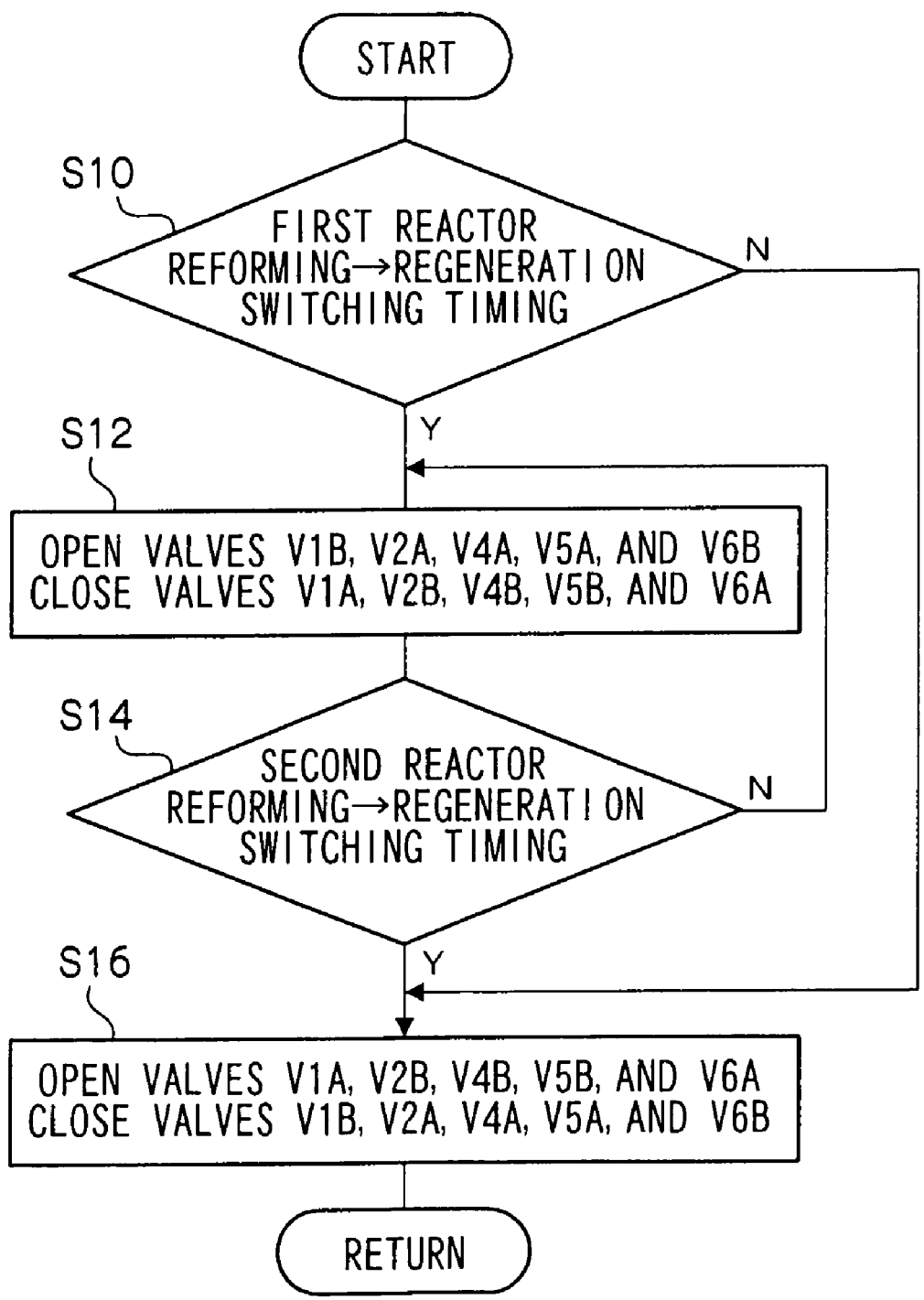
FIG. 4 is a flow chart showing a basic control flow of the control system that configures the fuel cell system according to embodiments of the present invention.

If it is determining that it is not a timing to switch the first reactor 18A from the reforming process to the regeneration process in step S10 of the flow chart shown in FIG. 4, the control apparatus 90 of the fuel cell system 10 proceeds to step S16. Then, the control apparatus 90 maintains the status at which the valves V1A, V2B, V4B, V5B, and V6A are open, as described above, and the valves V1B, V2A, V4A, V5A, and V6B are closed. On the other hand, when the catalyst temperature of the first reactor 18A that has been performing the reforming reaction has dropped and the reforming reaction cannot be maintained (this being determined by a control parameter such as the elapse of a predetermined period of time, the dropping of the catalyst temperature below a threshold value or the like) the control apparatus 90 switches the first reactor 18A from the reforming process to the regeneration process by switching the switching device 20. In addition, approximately at the same time as this switching, the control apparatus 90 switches the second reactor 18B from the regeneration process to the reforming process. In other words, determining that it is the timing for switching the first reactor 18A from the reforming process to the regeneration process, the control apparatus 90 proceeds to step S12 and then, the control apparatus 90 closes the valves V1A, V2B, V4B, V5B, and V6A and opens the valves V1B, V2A, V4A, V5A, and V6B. Thereby, the fuel cell system 10 is switched from the status shown in FIG. 5 into the status shown in FIG. 6.

The parts that are different from the status shown in FIG. 5 will be described. The reforming reaction gas exhausted from the mixer 26 is fed into the second reactor 18B via the bridge conduit 28 (the valve V1B) and second line 36B, the reforming reaction occurs with contact with the catalyst, and the fuel gas containing hydrogen and carbon monoxide is generated. This fuel gas is introduced into the anode electrode in the heat exchanger 16 and the fuel cell 14 via the fourth line 38B and the bridge conduit 40 (the valve V6B). The cathode-off gas exhausted from the fuel cell 14 passes the heat exchanger 16, is introduced into the mixer 26, is mixed with the hydrocarbon reactant to be made into the reforming reaction gas as described above, and then, it is introduced into the second reactor 18B.

The anode-off gas exhausted from the fuel cell 14 is introduced into the first reactor 18A via the gas for regeneration introduction line 44, the bridge conduit 40 (the valve V5A), and the third line 38A. On the other hand, the cooling air exhausted from the fuel cell 14 is introduced into the first reactor 18A via the cooling air exhaust line 54 and the combustion air feeding line 52A (the valve V4A). In this first reactor 18A, the catalyst temperature rises to the temperature to obtain the reforming reaction by the combusting of the anode-off gas contacting the catalyst together with the air for cooling, and the heat necessary for reforming is accumulated. The regeneration exhaust gas as the combustion gas generated by this combusting is exhausted to the outside of the system via the first line 36A, the bridge conduit 28 (the valve V2A), and the exhaust line 30.

In addition, when it is determined that it is not a timing to switch the second reactor 18B from the reforming process into the regeneration process in step S14 of the flow chart shown in FIG. 4 (a timing to switch the first reactor 18A from the regeneration process into the reforming process), the control apparatus 90 of the fuel cell system 10 returns to step S12. Then, the control apparatus 90 keeps the status at which the valves V1B, V2A, V4A, V5A, and V6B are open, as described above, and the valves V1A, V2B, V4B, V5B, and V6A are closed. On the other hand, when it is determined that it is a timing for switching the second reactor 18B from the reforming process to the regeneration process, the control apparatus 90 proceeds to step S16 and then, the control apparatus 90 closes the valves V1B, V2A, V4A, V5A, and V6B and releases the valves V1A, V2B, V4B, V5B, and V6A. Thereby, the fuel cell system 10 is switched from the status shown in FIG. 6 to the status shown in FIG. 5.

As described above, the fuel cell system 10 is configured so as to be capable of continuously feeding the fuel gas to the fuel cell 14 and generating electric power stably and continuously, although each reactor 18 alternately repeats the reforming process and the regeneration process and generates fuel gas intermittently (in batches). Further, in the fuel cell system 10, since the fuel cell 14 separates only the hydrogen from the fuel gas by the hydrogen separation membrane and uses the residual gas as the fuel for the regeneration process, it is not necessary to carry out the shift reaction of obtaining hydrogen and carbon dioxide by further reacting carbon monoxide in the fuel gas obtained in the reforming process with water. The shift reaction has a low reaction speed and requires a large reactor, however, since this shift reaction is not necessary, the fuel cell system 10 can be made more compact.

SUMMARY OF THE PRESENT INVENTION

Then, according to the present invention: upon switching from the reforming process of the reactor 18 to the regeneration process thereof, the reforming reaction gas remaining in the reactor 18 or the generated fuel gas is processed; or upon switching from the regeneration process of the reactor 18 into the reforming process thereof, the gas for regeneration remaining in the reactor 18 is processed. Hereinafter, each embodiment will be described, however, components and parts that are the same as the fuel cell system 10 having the above-described basic configuration or the above-described embodiments are given the same reference numerals as those in the fuel cell system 10 or the above-described embodiments, and hence the explanation thereof will be omitted. Further, for the same operations as the basic operation (the operation shown in the flow chart of FIG. 4), the explanations thereof will be omitted. Further, with respect to the effect of each embodiment to be described below, switching between the reforming process and the regeneration process in the first reactor 18A will be described, and the explanation will be omitted of the switching operation of the second reactor 18B operated in the same way (merely different by the switching timing).

First Embodiment

Figure 1:
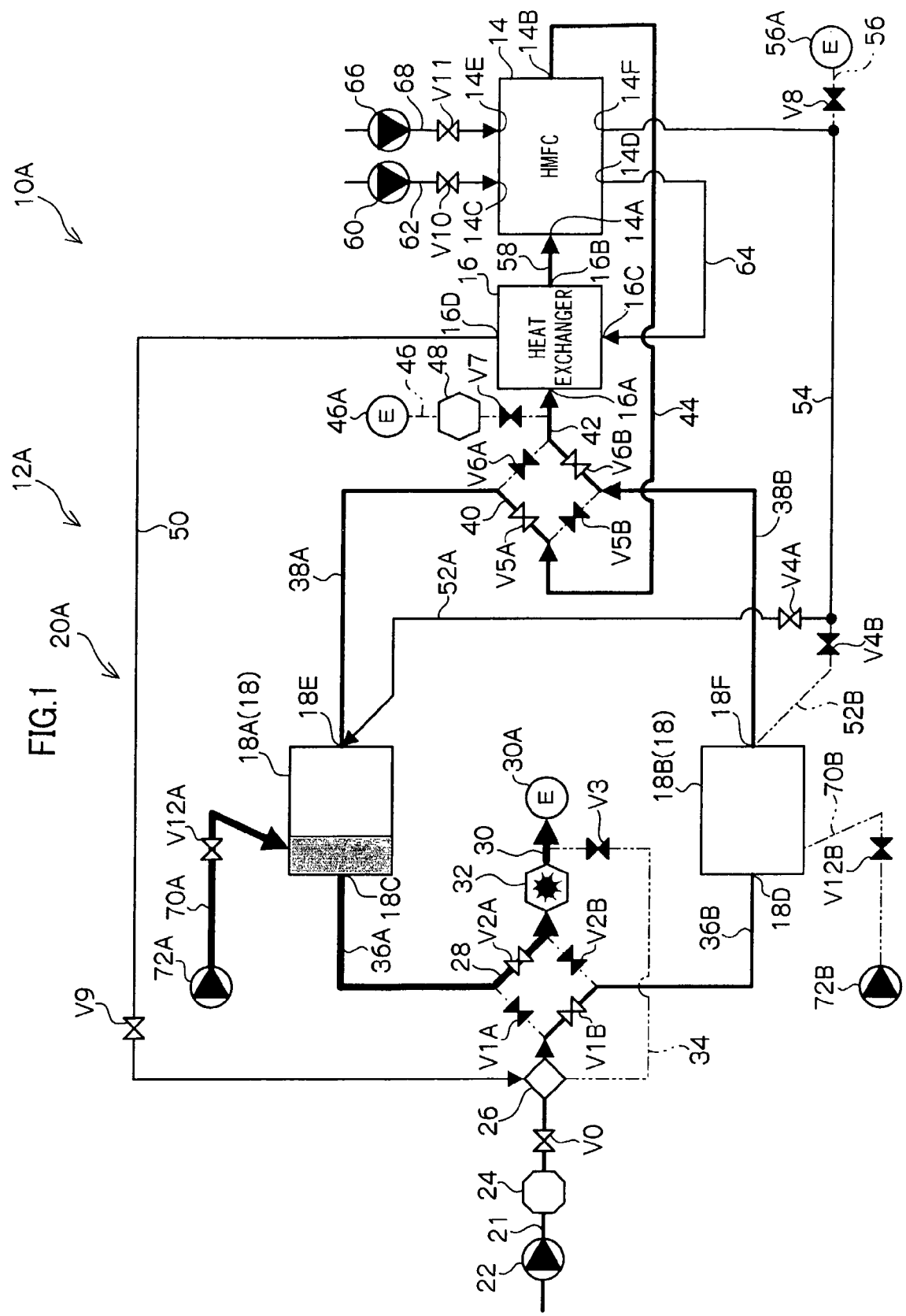
FIG. 1 is a system block diagram of a fuel cell system according to a first embodiment of the present invention.

FIG. 1 illustrates the fuel cell systems 10A according to the first embodiment of the present invention. FIG. 1 illustrates the status at which the reactor 18A is switched from the reforming process into the regeneration process.

As shown in this FIG. 1, the fuel cell system 10A is provided with a hydrogen fuel feeding system 12A, and the hydrogen fuel feeding system 12A has a switching device 20A that is provided, in addition to the configuration of the switching device 20, with auxiliary air feeding lines 70A and 70B for introducing air from the cylinder shaped tubular wall portion of each reactor 18. One end of the auxiliary air feeding lines 70A and 70B is connected to the exhaust parts of respective air pumps 72A and 72B. Thereby, the switching device 20A is configured so as to be capable of directly introducing air into the reactors 18, without passing through the first line 36A, the second line 36B, the third line 38A, the fourth line 38B, and the combustion air feeding lines 52A and 52B. Further, the air pumps 72A and 72B may be a common pump. On the auxiliary air feeding line 70A, is disposed a valve V12A, and on the auxiliary air feeding line 70B, is disposed a valve V12B. Respective auxiliary air feeding lines 70A and 70B are connected so as to feed the combustion-supporting air to the first ports 18C and 18D with respect to the center portion in a gas flowing direction in the corresponding reactor 18.

As shown in FIG. 3, a control apparatus 90A of this fuel cell system 10A is electrically connected to the valves V12A, V12B, and the air pumps 72A and 72B, respectively, so as to control them. The control apparatus 90A according to this embodiment normally closes the valve V12A and when the first reactor 18A is switched from the reforming process to the regeneration process, the air pump 72A is activated and the switching device 20A is switched so that combustion-supporting air is introduced from the auxiliary air feeding line 70A in the first reactor 18A. According to this embodiment, at the same time as the valve V1A is closed and the valve V2A is opened or just after the valve V2A is opened, the valve V12A is released only for a predetermined period of time. In addition, this control apparatus 90A normally closes the valve V12B and when the reactor 18B is switched from the reforming process to the regeneration process, the air pump 72B is activated and the switching device 20A is switched so that combustion-supporting air is introduced from the auxiliary air feeding line 70B into the second reactor 18B. According to this embodiment, at the same time as the valve V1B is closed and the valve V2B is opened or just after the valve V2B is opened, the valve V12B is released for a predetermined period of time. The control operation of the control apparatus 90A will be complemented with the explanation of the operation of the present embodiment to be described later.

The other configuration of the fuel cell system 10A is the same as the corresponding configuration of the fuel cell system 10, however, the fuel cell system 10A requires an exhaust air processor 32 having an oxidation catalyst as an essential component portion disposed on the exhaust path of the regeneration exhaust gas (the exhaust line 30). In other words, according to this embodiment, the exhaust air processor 32 configures the residual reforming gas processor together with the auxiliary air feeding lines 70A and 70B, the air pumps 72A and 72B, and the valves V12A and V12B. In addition, the auxiliary air feeding lines 70A and 70B, the air pumps 72A and 72B, and the valves V12A and V12B are equivalent to an oxygen feeding device for feeding oxygen in order to oxygenate the residual reforming gas.

Next, the operation of the first embodiment will be described.

In the fuel cell system 10A according to the first embodiment, when the reactor 18A is switched from the reforming process to the regeneration process the reforming reaction gas having the hydrocarbon reactant, steam, and oxygen or the like mixed therein and the reformed fuel gas (hereinafter, they may be collectively referred to as residual reforming gas) remain within the reactor 18A, as shown in FIG. 1 represented by a dot. Then, when the first reactor 18A as shown in FIG. 5 is switched from the status of performing the reforming process into the status shown in FIG. 1, by closing the valves V1A, V2B, V4B, V5B, and V6A and opening the valves V1B, V2A, V4A, V5A, and V6B, the valve V12A is released and combustion-supporting air is fed from the auxiliary air feeding line 70A into the first reactor 18A. Also, in the first reactor 18A, the regeneration process is started by feeding the anode-off gas and the cooling the combustion-supporting air from the second port 18E.

Therefore, the residual reforming gas and the combustion-supporting air are pushed out from the first port 18C to the outside of the first reactor 18A to be introduced into the exhaust air processor 32 via the first line 36A, the bridge conduit 28 (the valve V2A), and the exhaust line 30. Then, the residual reforming gas is oxygenated (combusts in this embodiment), contacting the oxidation catalyst of the exhaust air processor 32 together with the combustion-supporting air, to be exhausted from the exhaust port 30A as combustion gas. Thus, by combusting (purifying) the residual reforming gas with the exhaust air processor 32, the residual reforming gas containing hydrocarbon and carbon monoxide is prevented from being exhausted to outside of the fuel cell system 10A without being processed. Further, the residual reforming gas may partially combust in the first reactor 18A contacting the catalyst of the first reactor 18A together with the combustion-supporting air.

After feeding the combustion-supporting air required for the processing of the residual reforming gas to the first reactor 18A, the control apparatus closes the valve V12A and stops the feeding of the combustion-supporting air to the first reactor 18A. Thereby, the first reactor 18A changes to the status at which the first reactor 18A carries out a normal reforming process. Further, the control apparatus controls a closing timing of the valve V12A, namely, a stop timing of feeding the combustion-supporting air depending on, for example, a releasing time of the valve V12A or the like.

Second Embodiment

Figure 7:
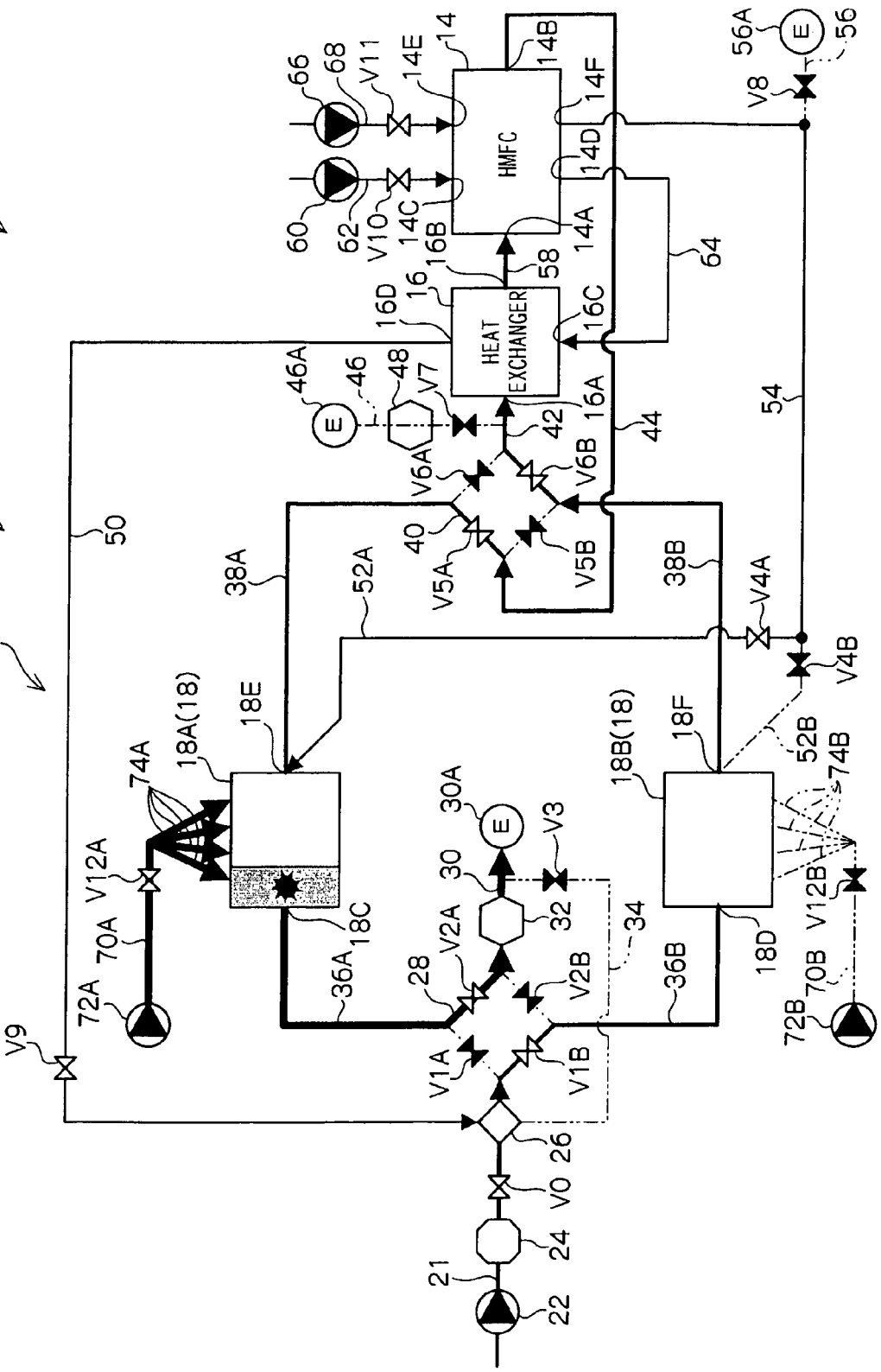
FIG. 7 is a system block diagram of the fuel cell system according to a second embodiment of the present invention.

FIG. 7 illustrates a fuel cell system 10B according to the second embodiment of the present invention. FIG. 7 shows the status at which the reactor 18A is switched from the reforming process to the regeneration process in the fuel cell system 10B.

As shown in FIG. 7, the fuel cell system 10B is provided with a hydrogen fuel feeding system 12B. The hydrogen fuel feeding system 12B is common to the hydrogen fuel feeding system 12A according to the first embodiment in that the hydrogen fuel feeding system 12B is provided with the auxiliary air feeding lines 70A and 70B, the air pumps 72A and 72B, and the valves V12A and V12B. A switching device 20B of this hydrogen fuel feeding system 12B is different from the first embodiment combusting residual reforming gas in the external exhaust air processor 32 in that the switching device 20B performs all of the oxidation processing (combusting in this embodiment) of the residual reforming gas within the first reactor 18A.

Specifically, the switching device 20B is provided with divided feeding lines 74A and 74B shaped in a manifold and the combining parts of the divided feeding lines 74A and 74B are connected to the auxiliary air feeding lines 70A and 70B on the downstream side. Each terminal of each of the divided feeding lines 74A and 74B shaped in a manifold is connected to a different position in an axial direction (a fluid flowing direction) at the tubular wall portion of the corresponding reactor 18. Thereby, the fuel cell system 10B is configured so that it is possible to feed combustion-supporting air to each portion of each reactor 18 approximately evenly and an airfuel ratio of each portion in each reactor 18 can be made to be within a combustion range. A control apparatus 90B of this fuel cell system 10B is operated in the same way as the control apparatus 90A of the fuel cell system 10A.

The other configurations of the fuel cell system 10B are the same as the corresponding configurations of the fuel cell system 10. In other words, according to this embodiment, the catalyst in the reactor 18 (the reforming catalyst) configures the residual gas processor in the present embodiment, together with the auxiliary air feeding lines 70A and 70B, the air pumps 72A and 72B, the divided feeding lines 74A and 74B, and the valves V12A and V12B.

Next, parts in the operation of the second embodiment different from the first embodiment will be mainly described.

In the fuel cell system, 10B according to the second embodiment, when the reactor 18A is switched from the reforming process to the regeneration process, the valve 12A is released and the combustion-supporting air is fed to the first reactor 18A. The combustion-supporting air is divided into portions in the gas flowing direction of the first reactor 18A, and is introduced therein approximately evenly via the auxiliary air feeding line 70A and the divided feeding line 74A. Then, the residual reforming gas combusts within the reactor 84 when both of this combustion-supporting air and the residual reforming gas contact the catalyst in the reactor 18A. This combustion gas is pushed by the gas for regeneration and the air for cooling (the combustion gas generated by reaction of the air for cooling) introduced from the second port 18E side to be exhausted from the first port 18C to outside of the reactor 18A and then, exhausted from the exhaust port 30A via the first line 36A, the bridge conduit 28 (the valve V2A), and the exhaust line 30. In other words, the regeneration reaction is started while discharging the combustion gas of the residual reforming gas.

Thus, by combusting (purifying) the residual reforming gas in the reactor 18A, the residual reforming gas containing hydrocarbons and carbon monoxide is prevented from being exhausted to the outside of the fuel cell system 10B without being processed. In addition, since the residual reforming gas is entirely combusted in the reactor 18, the fuel cell system 10B can be configured without the external exhaust air processor 32. Further, heat generation due to combusting of the residual reforming gas can be used for heating the catalyst of the reactor 18 (preheat before regeneration), and the combustion heat is not wasted to the outside, so that the total efficiency of the fuel cell system 10B is improved.

Figure 8:
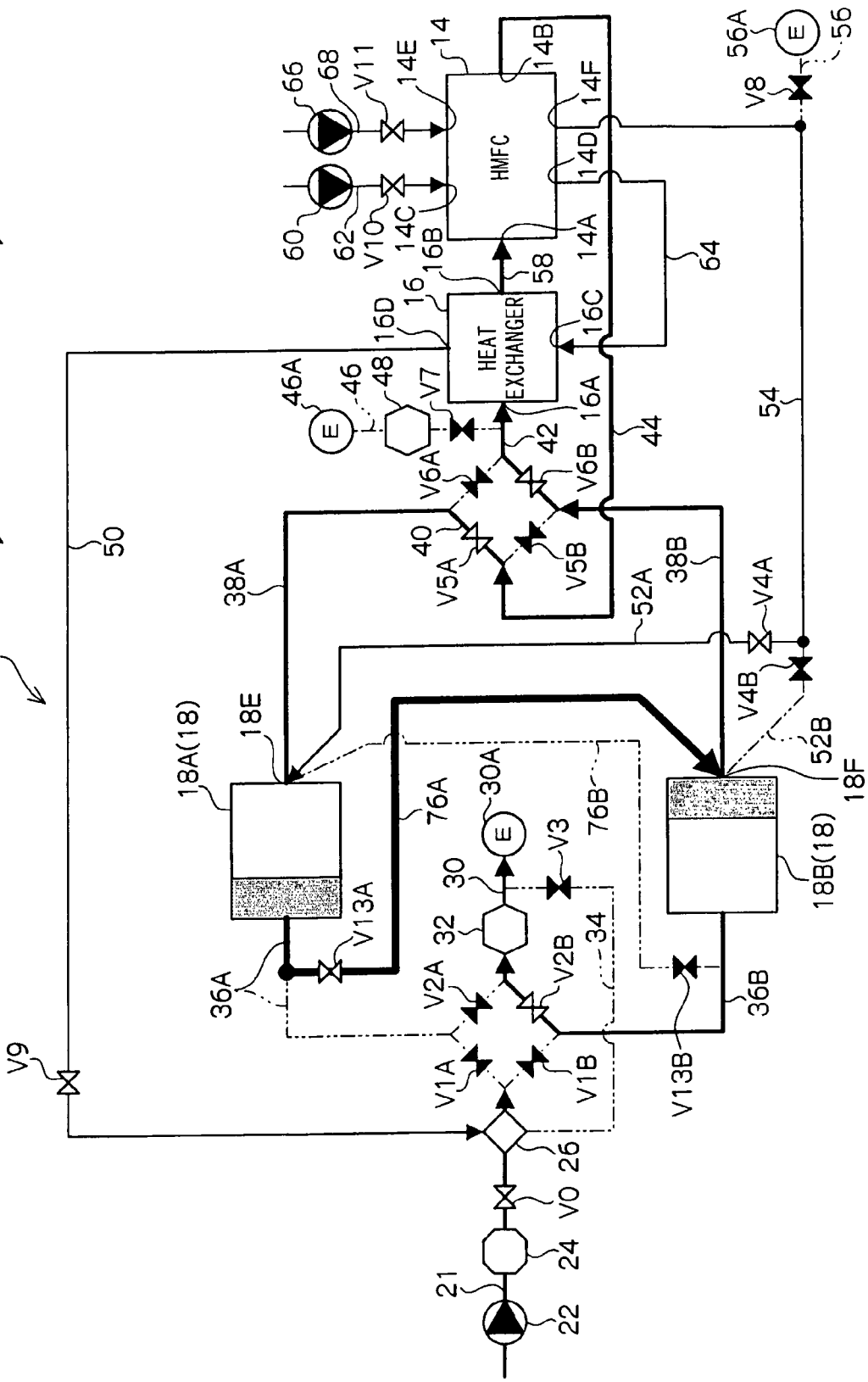
FIG. 8 is a system block diagram of the fuel cell system according to a third embodiment of the present invention.

FIG. 8 illustrates a fuel cell system 10C according to the third embodiment. Further, FIG. 8 shows the status in which the reactor 18A is switched from the reforming process into the regeneration process in the fuel cell system 10C.

As shown in FIG. 8, the fuel cell system 10C is provided with a hydrogen fuel feeding system 12C, and the hydrogen fuel feeding system 12C is configured in such a manner that the switching device 20C includes in addition to the configuration of the switching device 20 a first scavenging line 76A and a second scavenging line 76B as residual reforming gas feeding lines. The first scavenging line 76A is branched from the first line 36A to be connected to the second port 18F of the second reactor 18B, and the second scavenging line 76B is branched from the second line 36B to be connected to the second port 18E of the first reactor 18A. On the first scavenging line 76A is disposed the valve V13A, and on the second scavenging line 76B is disposed the valve V13B.

As shown in FIG. 3, the control apparatus 90C of the fuel cell system 10C is electrically connected to the valves V13A and V13B, respectively, so as to control opening and closing of them. Specifically, the control apparatus 90C normally closes the valve V13A, and the control apparatus 90C is configured in such a manner that, before the second reactor 18B shifts to the reforming process (a period during which the open status of valve V2B is maintained) when the first reactor 18A is switched from the reforming process into the regeneration process (the valve V1A is closed), the closed status of valves V1A and V2B (the exhaust path of the regeneration exhaust gas of the first reactor 18A) and the open status of the valve V2B are maintained and the valve V13A is opened. In addition, this control apparatus 90C normally closes the valve V13B, and the control apparatus 90C is configured in such a manner that, when the second reactor 18B is switched from the reforming process into the regeneration process, the closed status (the exhaust path of the regeneration exhaust gas of the second reactor 18B) and the open status of the valve V2A are maintained and the valve V13B is opened. The other parts of the configuration of the fuel cell system 10C are the same as the corresponding configurations of the fuel cell system 10. The control operation of the control apparatus will be complemented by the description about the effect of the present embodiment to be described later. The other configurations of the fuel cell system 10C are the same as the corresponding configurations of the fuel cell system 10.

Next, the operation of the third embodiment will be described.

In the fuel cell system 10C according to the third embodiment, when the reactor 18A is switched from the reforming process into the regeneration process, the residual reforming gas remains within the reactor 18A, as shown by the dot in FIG. 1. Then, when the first reactor 18A as shown in FIG. 5 is switched from the status of performing the reforming process into the status shown in FIG. 8 by closing the valves V1A, V4B, V5B, and V6A and opening V4A, V5A, V6B, and V13A, the residual reforming gas of the first reactor 18A is pushed out by air for cooling, introduced from the combustion air feeding line 52A into the reactor 18A, and is introduced into the second reactor 18B while gradually mixing with the air for cooling through the first scavenging line 76A. Then, the mixed residual reforming gas and air combust contacting the catalyst of the second reactor 18B. This combustion gas is then exhausted from the second line, 36B, the bridge conduit 28 (the valve V2B), and the exhaust line 30.

Thus, by combusting (purifying) the residual reforming gas of the first reactor 18A after the reforming process within the second reactor 18B before shifting to the reforming process, the residual reforming gas containing hydrocarbon and carbon monoxide is prevented from being exhausted to outside of the fuel cell system 10C without being processed. In addition, since the residual reforming gas is entirely combusted within the reactors 18, it is possible to configure the fuel cell system 10C without disposing an external exhaust air processor 32. Further, heat generation accompanying combustion of the residual reforming gas of the first reactor 18A can be used for heating of the catalyst in the second reactor 18B (or the other way round) and the combustion heat is not discarded to the outside. Therefore, the total efficiency of the fuel cell system 10C is improved.

After an elapse of a time required for the processing of the residual reforming gas, the control apparatus opens the valve V1B and the valve V2A from the status shown in FIG. 8, and closes the valve V2B and the valve V13A. Thus, the control apparatus completely shifts to the regeneration process of the first reactor 18A and the reforming process of the second reactor 18B.

According to the third embodiment, an example where the residual reforming gas is fed by air from the combustion air feeding line 52A is indicated, however, the present invention is not limited to this. For example, air may be introduced from the combustion air feeding line 52B into the second reactor 18B in advance and the residual reforming gas of the first reactor 18A may be fed to the second reactor 18B side by the regeneration exhaust gas of the first reactor 18A. Further it is possible, for example, to provide a bypass line communicating the steam feeding line 50 with the gas for regeneration introduction line 44, the residual reforming gas of the first reactor 18A may be fed to the second reactor 18B side by steam and air or the like introduced into the first reactor 18A through this bypass line, the bridge conduit 40, and the third line 38A.

Fourth Embodiment

Figure 9:
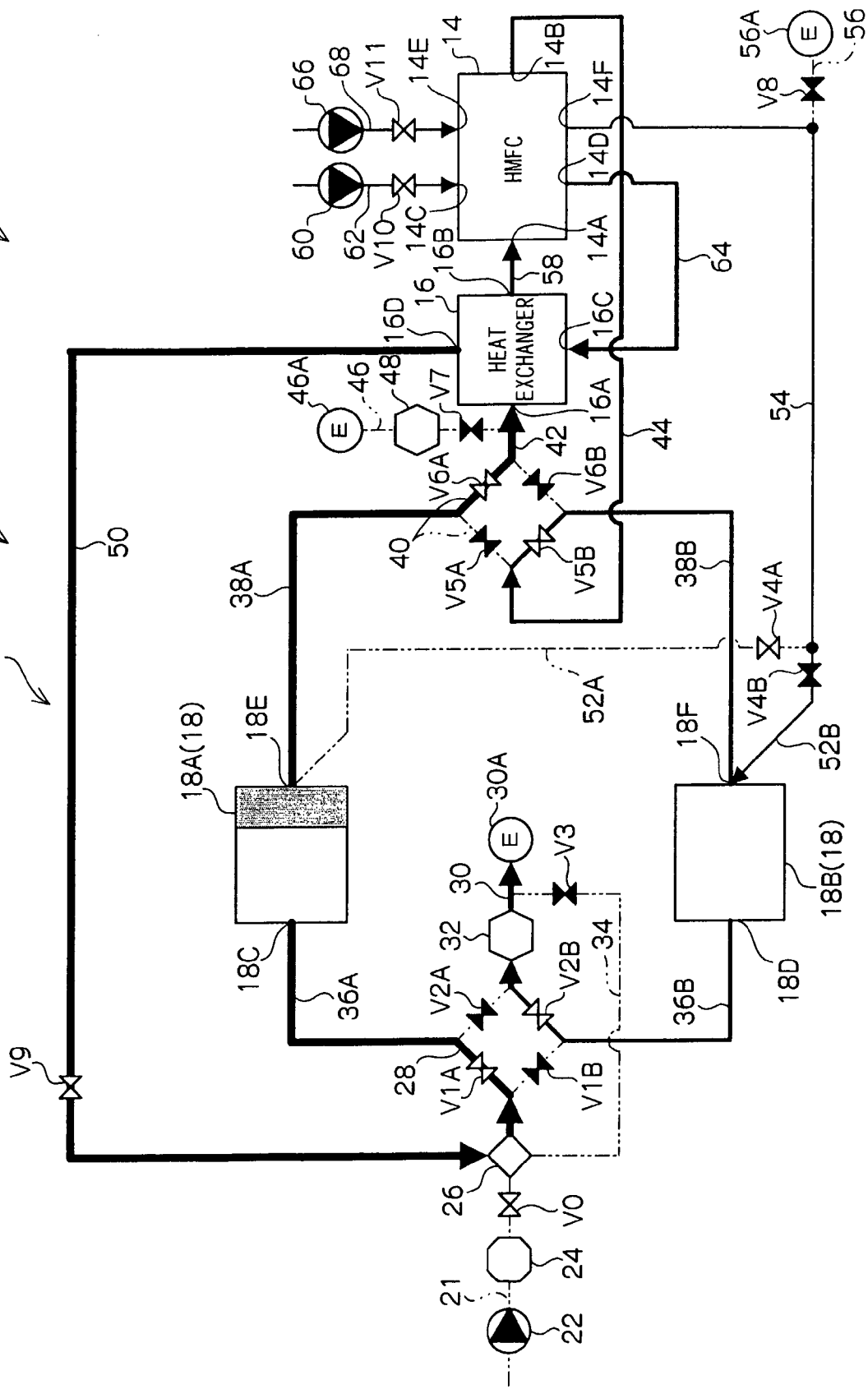
FIG. 9 is a system block diagram of the fuel cell system according to a fourth embodiment of the present invention.

FIG. 9 illustrates a fuel cell system 10D according to the fourth embodiment. Further, FIG. 9 shows the status at which the reactor 18A is switched from the reforming process into the regeneration process in the fuel cell system 10D.

As shown in FIG. 8, the mechanical configuration of the fuel cell system 10D is entirely the same as the basic configuration of the fuel cell system 10. In other words, in the fuel cell system 10D, the mechanical configuration of a switching device 20D in a hydrogen fuel feeding system 12D is the same as that of the switching device 20 and the switching device 20D is characterized by the switching control of a control apparatus 90D from the reforming process to the regeneration process of the reactor 18. Specifically, in the fuel cell system 10D, the control apparatus 90D is configured so as to stop the feeding of the hydrocarbon reactant to the hydrogen fuel feeding system 12 by closing the valve V0 (stopping the fuel pump 22) before the first reactor 18A that has completed the reforming process (the reforming reaction) shifts to the regeneration process. As well as this, this control apparatus 90D is configured so as to stop the feeding of the hydrocarbon reactant to the hydrogen fuel feeding system 12 by closing the valve V0 before the second reactor 18B that has completed the reforming process shifts to the regeneration process. The control operation of the control apparatus will be complemented by explanation of the operation of the present embodiment below. In this embodiment, the valve V0 is equivalent to a channel opening and closing apparatus of the present invention.

Next, the operation of the fourth embodiment will be described.

In the fuel cell system 10D according to the fourth embodiment, the control apparatus 90D stops the feeding of the hydrocarbon reactant to the hydrogen fuel feeding system 12 by closing the valve V0 before the first reactor 18A completes the reforming process. In this case, the fuel cell 14 that operates with a time lag from the operation of the hydrogen fuel feeding system 12 continues generation of electric power, that is, exhausting of the cathode-off gas. Then, the residual reforming gas of the first reactor 18A is pushed out from the second port 18B by the cathode-off gas (air containing steam) introduced into the first reactor 18A via the mixer 26, the bridge conduit 28, and the first line 36A. Then, the residual reforming gas is fed to the fuel cell 14 via the third line 38A, the bridge conduit 40, the fuel gas feeding line 42, the heat exchanger 16, and the fuel gas line 58. The hydrogen in the residual reforming gas is consumed at the fuel cell 14 and the other components are consumed (combustion-processed) in the second reactor 18B as the anode-off gas, namely, the gas for regeneration.

In this way, by stopping feeding of the hydrocarbon reactant before the reforming process has been completely finished, the residual reforming gas is fed to the fuel cell 14 and the second reactor 18B (destination of fuel gas feeding) by the cathode-off gas and it is consumed before completion of the reforming process. Accordingly, since there is no residual reforming gas in the reactor 18A when the reactor 18A shifts to the regeneration process, the residual reforming gas containing hydrocarbon and carbon monoxide is prevented from being exhausted to outside of the fuel cell system 10D without being processed. Further, since the residual reforming gas of the first reactor 18A is partially used for heat generation by the fuel cell 14 and part of the residues can be used for heating the catalyst of the second reactor 18B, the combustion heat is not discarded to the outside and this leads to an improvement of the total efficiency of the fuel cell system 10D. In addition, a cost for providing the additional elements (auxiliary air feeding line 70A, air pump 72B, and first scavenging line 76A or the like) is not required, so that the system configuration can be simplified and made more compact overall.

Fifth Embodiment

Figure 10:
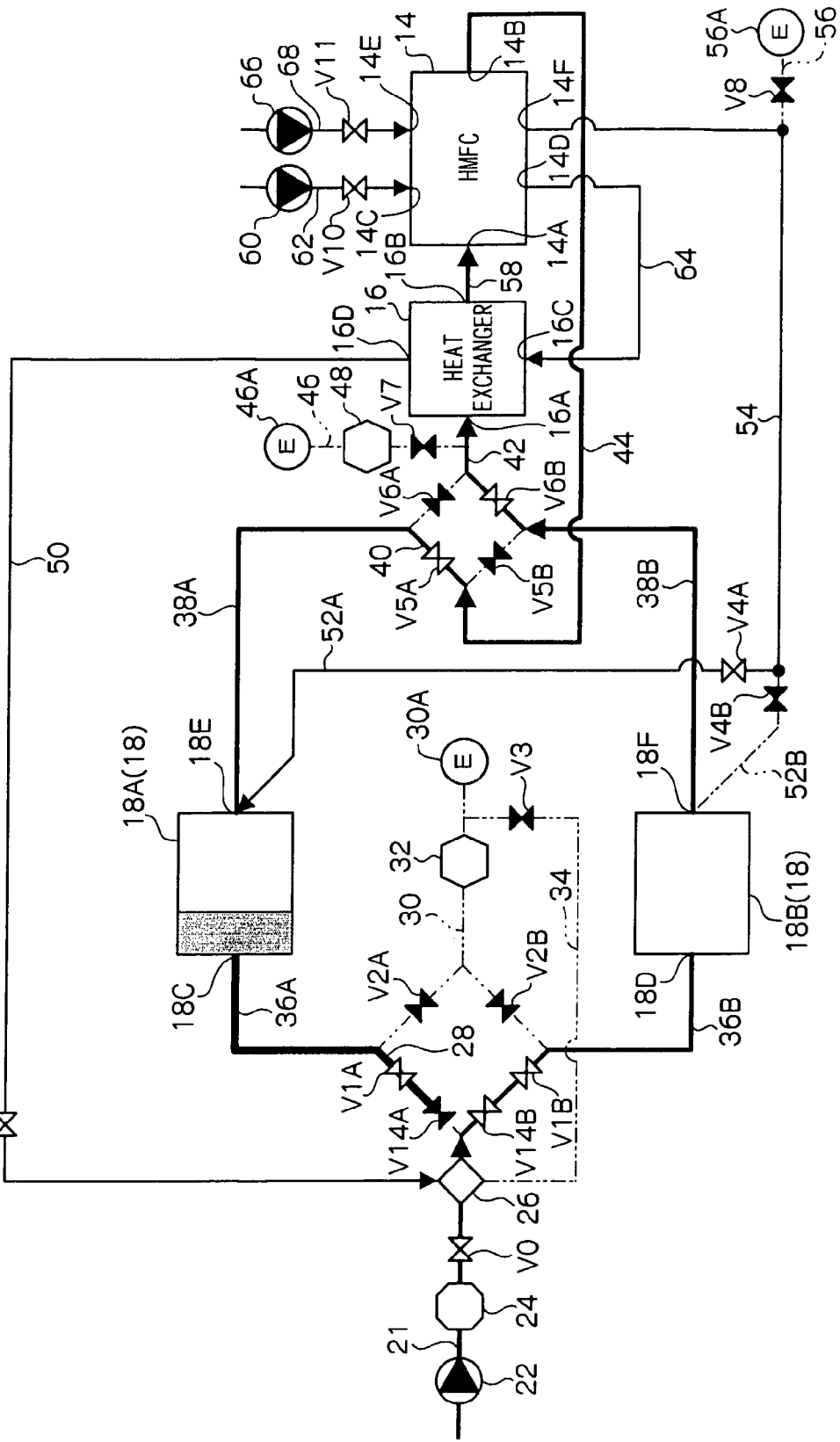
FIG. 10 is a system block diagram of the fuel cell system according to a fifth embodiment of the present invention.
Figure 11:
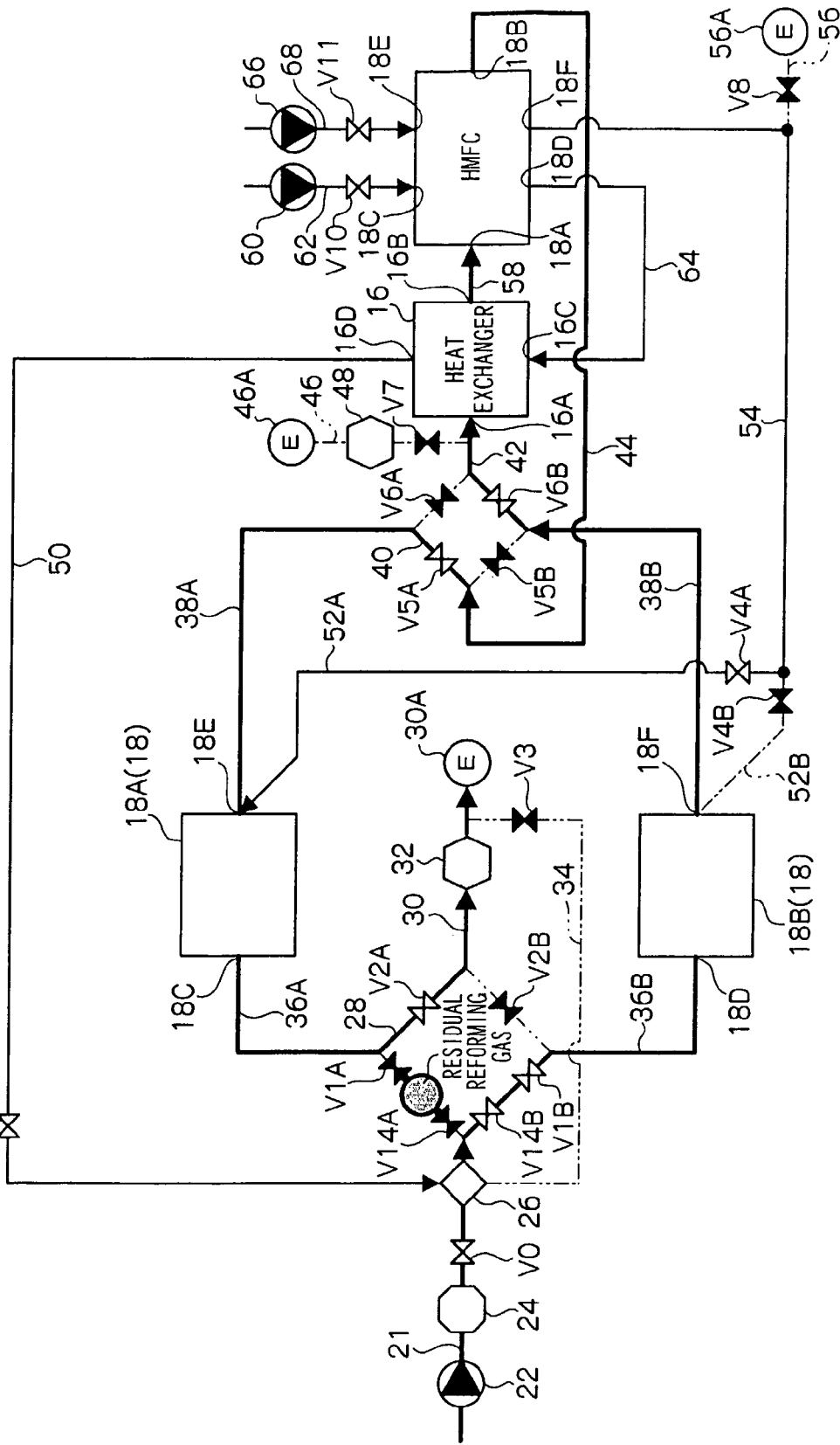
FIG. 11 is a system block diagram of the other status of the fuel cell system according to a fifth embodiment of the present invention.

FIG. 10 and FIG. 11 illustrate a fuel cell system 10E according to the fifth embodiment. Further, FIG. 10 illustrates the status at the point when the reactor 18A is switched from the reforming process into the regeneration process, and FIG. 11 illustrates the status when the reactor 18A has been switched into the regeneration process.

As shown in FIG. 10 and FIG. 11, a switching device 20E in a hydrogen fuel feeding system 12E configuring a fuel cell system 10E is provided with all the components of the switching device 20 and further, the hydrogen fuel feeding system 12E is provided with a valve V14A, arranged between the connection portion of the material feeding line 21 in the bridge conduit 28 and the valve V1A, and a valve V14B arranged between the connection portion of the material feeding line 21 in the bridge conduit 28 and the valve V1B.

As shown in FIG. 3, a control apparatus 90E of this fuel cell system 10E is electrically connected to each of the valves V14A and V14B and the control apparatus 90E controls opening and closing of them. When the first reactor 18A is switched from the reforming process of releasing the valves V1A and V14A into the regeneration process (when the valves V1B and V14B are opened and the second reactor 18B shifts to the reforming process), the control apparatus 90E is able to close the valve V14A while maintaining an open status of the valve V1A and a closed status of the valve V2A. Then, after the elapse of a predetermined period of time, the control apparatus closes the valve V1A and open the valve V2A, and switches the first reactor 18A into the regeneration process completely. In addition, when the valves V1B and V14B are opened and the second reactor 18B is switched from the reforming process to the regeneration process, the control apparatus 90E is able to close the valve V14B while maintaining an open status of the valve V1B and a closed status of the valve V2B. Then, after the elapse of a predetermined period of time, the control apparatus closes the valve V1B and opens the valve V2B and switches the second reactor 18B into the regeneration process completely. The control operation of the control apparatus will be complemented by explanation about the operation of the present embodiment described below.

The other parts of the configuration of the fuel cell system 10E are the same as the corresponding configuration of the fuel cell system 10. According to this embodiment, the configuration between the material feeding line 21, for distributing the reforming reaction gas in the bridge conduit 28, and the first lines 36A and 36B is equivalent to the material feeding line of the present invention and configures a residual reforming gas temporary containment part together with the valves V1A, V14A; and the valves V1B and V14B.

Next, the operation of the fifth embodiment will be described.

In the fuel cell system 10E according to the fifth embodiment, when the reactor 18A is switched from the reforming process into the regeneration process, the residual reforming gas remains in the reactor 18A. Then, when the first reactor 18A as shown in FIG. 5 is switched from the status of performing the reforming process into the status shown in FIG. 10 by closing the valves V2B, V4B, V5B, V6A, and V14A and opening the valves V1B, V4A, V5B, V6B, and V14B, the regeneration process is started in the first reactor 18A and further, the reforming process is started in the second reactor 18B.

Therefore, in the first reactor 18A, the residual reforming gas is pushed out from the first port 18C by the regeneration exhaust gas generated in the regeneration process, pushed, in compression, to the valve V14A side of the bridge conduit 28 through the first line 36A. After the elapse of a time for pushing the residual reforming gas between the valve V14A and the valve V1A in the bridge conduit 28, the valve V1A is closed. Thereby, as shown in FIG. 11, the residual reforming gas is closed between the valve V1A and the valve V14A. In other words, the residual reforming gas is temporarily contained in a line that has not been used at that time point. Almost simultaneously with a closing of the valve V1A, the valve V2A is released and the regeneration exhaust gas of the first reactor 18A shifts to a normal step at which it is exhausted from the exhaust port 30A through the exhaust line 30.

Then, when the first reactor 18A is switched from the regeneration process into the reforming process, the valves V1A and V14A are released and the residual reforming gas is pushed out by the reforming reaction gas from the mixer 26 to be introduced into the first reactor 18A. In other words, the residual reforming gas that has been temporarily evacuated is returned to the first reactor 18A to be reused as the reforming reaction gas or the reforming product. Thus, by temporarily putting the reforming reaction gas into a temporary containment area and using it in the next reforming process, the residual reforming gas containing hydrocarbon and carbon monoxide is prevented from being exhausted to the outside of the fuel cell system 10A without being processed. In addition, since the residual reforming gas is used as the reforming reaction gas or the reforming product that is the original use thereof, namely, the material is not discarded to the outside of the system, the total efficiency of the fuel cell system 10E is improved.

Further, according to the fifth embodiment, an example where the residual reforming gas is put temporarily into a containment area between the valve V1A and the valve V14A in the bridge conduit 28, or between the valve V1B and the valve V14B in the bridge conduit 28, is described, however, the present invention is not limited to this. For example, an accumulator or the like for temporarily containing the residual reforming gas may be connected between the valve V1A and the valve V14A. In addition, according to the fifth embodiment, an example of feeding the residual reforming gas by the regeneration exhaust gas is described, however, the present invention is not limited to this. For example, the residual reforming gas may be fed by air from the combustion air feeding line 52A. In addition, for example, by providing a bypass line to communicate the steam feeding line 50 with the gas for regeneration introduction line 44, the residual reforming gas may be fed by steam and air or the like to be introduced into the first reactor 18A through this bypass line, the bridge conduit 40, and the third line 38A.

Sixth Embodiment

Figure 12:
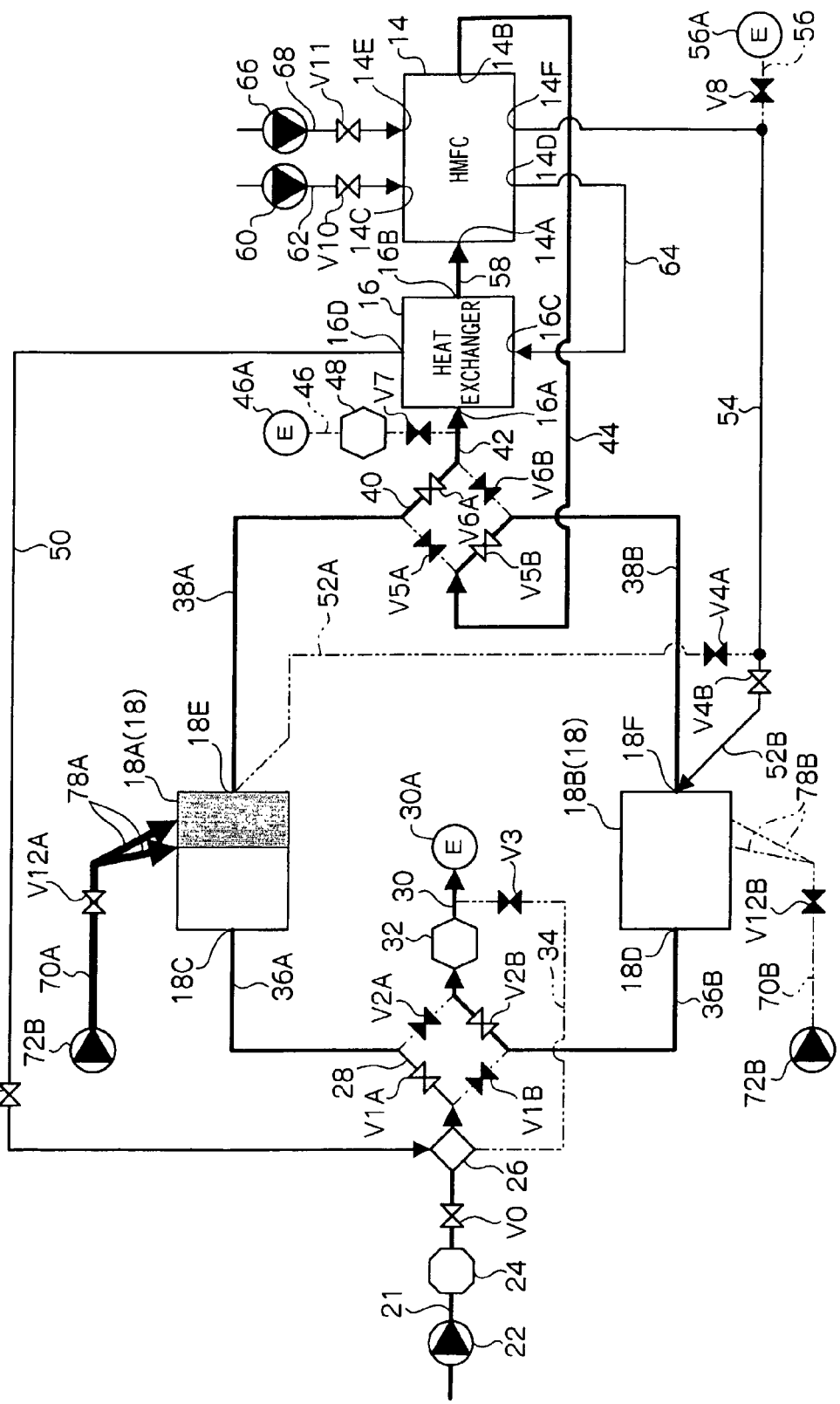
FIG. 12 is a system block diagram of the fuel cell system according to a sixth embodiment of the present invention.

FIG. 12 shows a fuel cell system 10F according to the sixth embodiment of the present invention. According to the embodiments shown in the sixth and subsequent embodiments, configurations to process the residual regeneration gas containing the gas for regeneration (the anode-off gas), air for combustion (air for cooling of the fuel cell 14), and the regeneration exhaust gas (the combustion gas) remaining in the reactor 18 when this reactor 18 is switched from the regeneration process into the reforming process, are described. Further, FIG. 12 shows the status at which the reactor 18A is switched from the regeneration process into the reforming process in the fuel cell system 10F.

As shown in FIG. 12, the fuel cell system 10F is provided with a hydrogen fuel feeding system 12F, and the hydrogen fuel feeding system 12F is common to that of the fuel cell system 10A according to the first embodiment in that a switching device 20F of the hydrogen fuel feeding system 12F is provided with auxiliary air feeding lines 70A and 70B, air pumps 72A and 72B, and valves V12A and V12B in addition to the configuration of the switching device 20. This sixth embodiment is different from the first embodiment described above in the way the residual reforming gas is processed.

Specifically, combining portions of divided feeding lines 78A and 78B shaped as a manifold are connected at the downstream ends of respective auxiliary air feeding lines 70A and 70B. Respective divided ends of the feeding lines 78A and 78B shaped in a manifold are connected to the tubular wall portions, at the second ports 18E and 18F sides in the axial direction (the fluid flowing direction), of the corresponding reactor 18.

In a control apparatus 90F of this fuel cell system 10F, the valve V12A is normally closed, and when the first reactor 18A is switched from the regeneration process into the reforming process, the air pump 72A is operated and the switching device 20F is switched so as to introduce air for dilution from the air feeding line 70A into the first reactor 18A. In this embodiment, at the same time as the valve V5A is closed and the valve V6A is opened or just after the valve V6A is opened, the valve V12A is opened for a predetermined period of time. In addition, in this control apparatus 90F, the valve V12B is normally closed, and when the second reactor 18B is switched from the regeneration process to the reforming process, the air pump 72B is operated and the switching device 20F is switched so as to introduce air for dilution from the air feeding line 70B into the second reactor 18B. In this embodiment, at the same time as the valve V5B is closed and the valve V6B is opened, or just after the valve V6B is opened, the valve V12B is released for a predetermined period of time. The control operation of the control apparatus 90F will be complemented by the explanation of the operation of the present embodiment described below.

The other parts of the configuration of the fuel cell system 10F are the same as the configuration corresponding to the fuel cell system 10. In this embodiment, the auxiliary air feeding lines 70A and 70B, the air pumps 72A and 72B, and the valves V12A and V12B configure a dilution gas feeding apparatus according to the present invention.

Next, the operation of the sixth embodiment will be described.

In the fuel cell system 10F according to the sixth embodiment, when the reactor 18A is switched from the regeneration process to the reforming process, the residual regeneration gas remains in the reactor 18A, represented by a dot as shown in FIG. 12. Then, when the first reactor 18A as shown in FIG. 6 is switched from the status of performing the regeneration process into the status shown in FIG. 1, by closing the valves V1B, V2A, V4A, V5A, and V6B and opening the valves V1A, V2B, V4B, V5B, and V6A, the valve V12A is opened and air for dilution is fed from the auxiliary air feeding line 70A in the first reactor 18A. Thereby, the residual regeneration gas in the reactor 18A is diluted by the air for dilution. The control apparatus 90F closes this valve V12A if a predetermined period of time has elapsed from release of the valve V12A (namely, a time required for feeding sufficient amounts of air in order to dilute the residual regeneration gas has passed). On the other hand, in the first reactor 18A, the reforming process is started when the reforming reaction gas from the mixer 26 is fed from the first port 18C side.

Therefore, the residual regeneration gas diluted by the air for dilution is fed to the anode electrode of the fuel cell 14 via the second port 18E, the third line 38A, the bridge conduit 40, the fuel gas feeding line 42, the heat exchanger 16, and the fuel gas line 58. Since the residual regeneration gas does not contain the hydrogen that is consumed by the fuel cell 14, the residual regeneration gas, passing through the fuel cell 14, is introduced into the second reactor 18B that is switched to the regeneration process. Then, the residual regeneration gas contacts the catalyst together with the combustion-supporting air, fed from the combustion air feeding line 52B to the second reactor 18B, and the part that has not yet been combust combusts. This combustion gas is exhausted to the outside via the exhaust line 30.

Thus, since the high temperature residual regeneration gas (containing combustible gases such as CO, $CH_4$, and $C_xH_y$, and combustion-supporting gases such as $O_2$) is pushed out, by the gases generated in the reforming process and introduced into the fuel cell 14, is diluted by air for dilution, this residual regeneration gas is prevented or restricted from damaging the component members of the fuel cell 14. In other words, the residual regeneration gas, a mixture of gases of the high temperature combustible gases and oxygen, is introduced into the fuel cell 14 and is oxidation-reacted by the catalyst disposed in the vicinity of the fuel gas inlet 14A of this fuel cell 14 so as to generate heat in the vicinity of this fuel gas inlet 14A. However, since the residual regeneration gas is diluted by the air for dilution, in other words, a heat capacity is increased by dilution, it is possible to control the rise in temperature due to the oxidation reaction (combustion). Thereby, damage to the component members of the fuel cell exposed to a high temperature gas is prevented or restricted. In addition, the high temperature residual regeneration gas is cooled by dilution by the air for dilution before it reaches the fuel gas inlet 14A of the fuel cell 14, so that auto-ignition of the residual regeneration gas before it reaches this fuel gas inlet 14A is prevented. In this way, by diluting the residual regeneration gas, a configuration where the residual regeneration gas is able to pass through the fuel cell 14 without damaging the fuel cell 14 is realized by diluting the residual regeneration gas. Therefore, for example, as compared with a configuration of providing a bypass channel in order to prevent the residual regeneration gas from passing through the fuel cell 14, the configuration and the control of this embodiment are simplified. Further, if the fuel gas containing no oxygen is fed to the fuel cell 14, oxidation and combustion of the residual regeneration gas is extinguished.

According to this embodiment, the fuel cell 14 and the second reactor 18B corresponding to the first reactor 18A (or vice versa) are equivalent to the destination of feeding the fuel gas, obtained in the reforming process.

Seventh Embodiment

Figure 13:
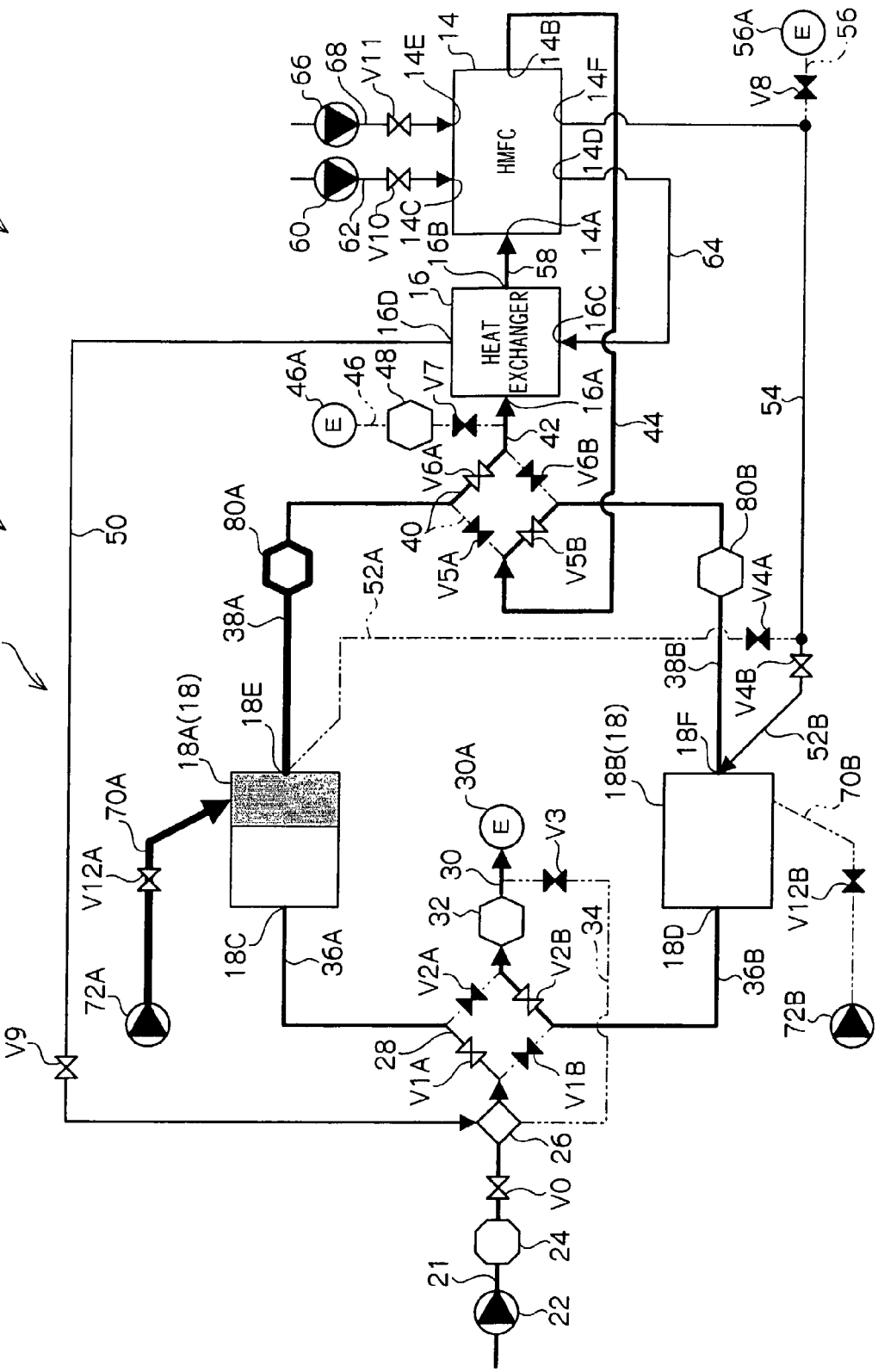
FIG. 13 is a system block diagram of the fuel cell system according to a seventh embodiment of the present invention.

FIG. 13 illustrates a fuel cell system 10G according to the seventh embodiment. Further, FIG. 13 shows the status in which the reactor 18A is switched from the regeneration process to the reforming process in the fuel cell system 10G.

As shown in FIG. 13, the fuel cell system 10G is common to the fuel cell system 10F according the sixth embodiment in that a switching device 20G of its hydrogen fuel feeding system 12G is provided with the auxiliary air feeding lines 70A and 70B, air pumps 72A and 72B, and valves V12A and V12B. This seventh embodiment is different from the sixth embodiment of diluting the residual regeneration gas in that exhaust air processors 80A and 80B, for performing the oxidation processing (in this embodiment, combustion) of the residual regeneration gas, are provided at the upstream side of the fuel cell 14. Specifically, the exhaust air processor 80A is disposed on the third line 38A and the exhaust air processor 80B is dispose on the fourth line 38B. The exhaust air processors 80A and 80B are configured so as to incorporate the oxidation catalyst in their respective housings, and they perform the residual regeneration gas oxidation processing (combustion). This oxidation catalyst holds cerium oxide (ceria), having an oxygen storage function, in large quantity (for example, about 50 g per liter). Therefore, cerium oxide in the exhaust air processors 80A and 80B store oxygen for oxidation of the residual regeneration gas. In addition, the auxiliary air feeding lines 70A and 70B are connected at the tubular wall portion of the corresponding reactor 18 in the vicinity of the second ports 18E and 18F ends, respectively.

A control apparatus 90G of the fuel cell system 10G normally closes the valve V12A and when the first reactor 18A is switched from the regeneration process into the reforming process, the control apparatus 90G operates the air pump 72A and switches the switching device 20G so that the combustion-supporting air is introduced from the auxiliary air feeding line 70A into the first reactor 18A. In this embodiment, at the same time as the valve V1A is closed and the valve V2A is opened or just after the valve V2A is opened, the valve V12A is opened for a predetermined period of time. In addition, in this control apparatus 90G, the valve V12B is normally closed, and when the second reactor 18B is switched from the regeneration process into the reforming process, the air pump 72B is operated and the switching device 20G is switched so as to introduce combustion-supporting air from the air feeding line 70B into the second reactor 18B. In this embodiment, at the same time as the valve V1B is closed and the valve V2B is opened, or just after the valve V2B is opened, the valve V12B is released for a predetermined period of time. The control operation of the control apparatus 90G will be complemented by the explanation about the operation of the present embodiment described below.

The other parts of the configuration of the fuel cell system 10G are the same as the configuration corresponding to the fuel cell system 10. In this embodiment, the exhaust air processors 80A and 80B configure a gas for regeneration processor together with the auxiliary air feeding lines 70A and 70B, the air pumps 72A and 72B, and the valves V12A and V12B. In addition, the auxiliary air feeding lines 70A and 70B and the air pumps 72A and 72B are equivalent to an oxygen feeding apparatus for feeding oxygen in order to oxidize the residual regeneration gas.

Next, in the effect of the seventh embodiment, the main parts that are different from the sixth embodiment will be described.

In the fuel cell system 10G according to the seventh embodiment, when the first reactor 18A as shown in FIG. 6 is switched from the status of performing the regeneration process to the status shown in FIG. 1, by closing the valves V1B, V2A, V4A, V5A, and V6B and opening the valves V1A, V2B, V4B, V5B, and V6A, the valve V12A is opened and air for oxidation is fed from the auxiliary air feeding line 70A in the first reactor 18A. The air for oxidation and the residual regeneration gas are pushed out from the second port 18E, by the generation gas of the reforming process that has been started in the first reactor 18A, and introduced into the exhaust air processor 80A that is disposed on the third line 38A. The residual regeneration gas is combusted contacting the oxidation catalyst of the exhaust air processor 80A together with the air for oxidation. This combustion gas is exhausted from the exhaust line 30 to outside of the system, via the fuel cell 14 and the second reactor 18B.

Thus, since the residual regeneration gas is combustion-processed at the upstream side of the fuel cell 14 (at the upstream side in a feeding direction of the fuel in the reforming process), in other words, the combustion gas temporarily introduced into the fuel cell 14 does not contain combustible gas, heat generation due to oxidation in the vicinity of the fuel gas inlet 14A of the fuel cell 14 is prevented, so that the residual regeneration gas is prevented or restricted from damaging the component members of the fuel cell 14. Then, the fuel cell system 10G can be configured so that the processed residual regeneration gas passes through the fuel cell 14. And as compared, for example, with the configuration of providing a bypass channel in order to prevent the residual regeneration gas from passing through the fuel cell 14, the configuration and the control of this embodiment are simplified. In addition, the exhaust air processors 80A and 80B can combust the residual regeneration gas with certainty, because its oxidation catalyst carries cerium oxide in a large quantity and oxygen is evenly stored in the exhaust air processors 80A and 80B. Further, part of the residual regeneration gas may be combusted in the first reactor 18A, contacting the catalyst of this first reactor 18A together with the combustion-supporting air.

After feeding the combustion-supporting air required for the processing of the residual regeneration gas to the first reactor 18A, the control apparatus closes the valve V12A and stops the feeding of the combustion-supporting air to the first reactor 18A. Further, for example, the control apparatus may control the closing timing of the valve V12A, namely the timing of stopping feeding, according to an opening time period of the valve V12A or the like.

Eighth Embodiment

Figure 14:
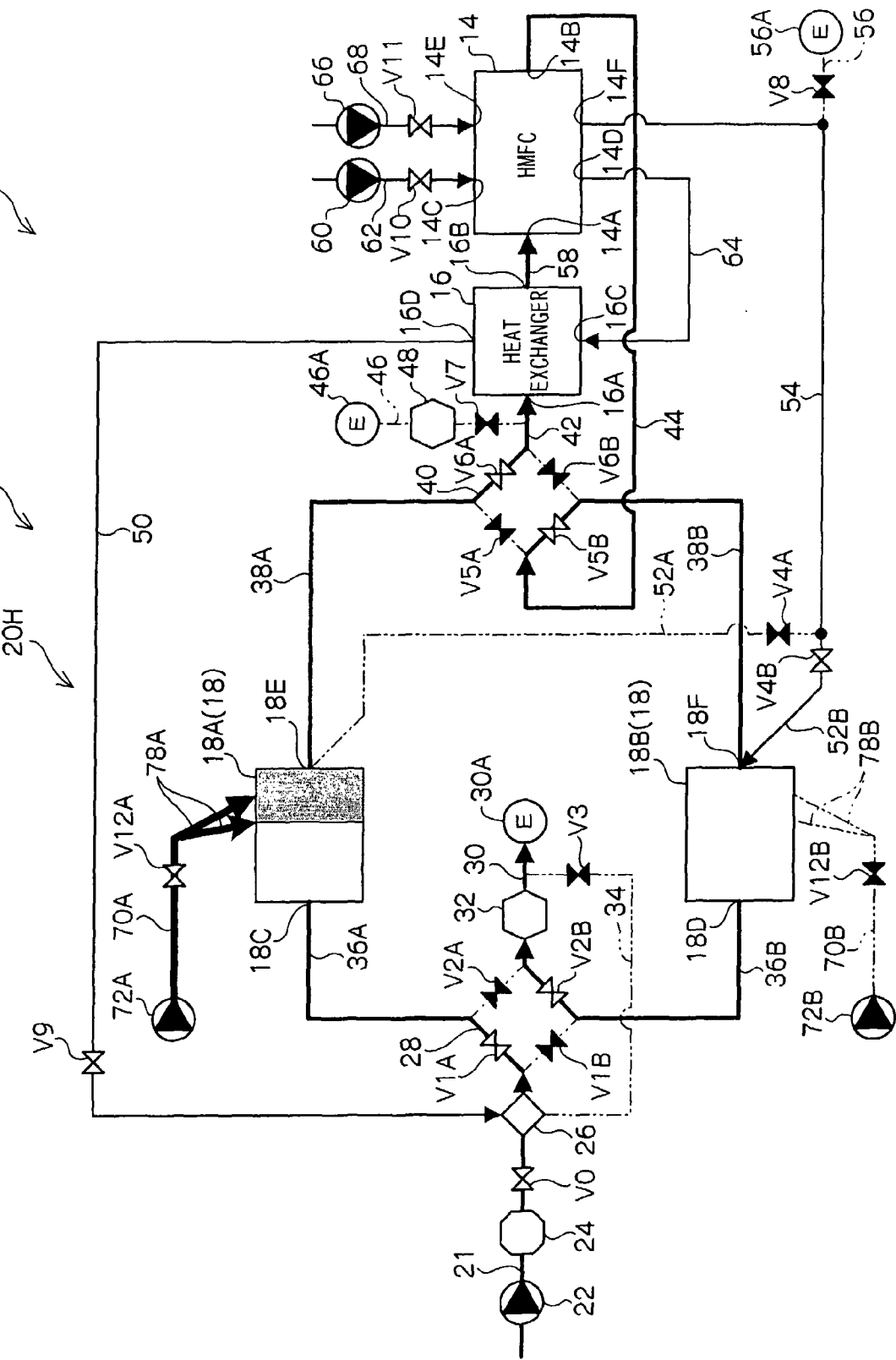
FIG. 14 is a system block diagram of the fuel cell system according to an eighth embodiment of the present invention.

FIG. 14 illustrates a fuel cell system 10H according to the eight embodiment of the present invention. Further, FIG. 14 shows the status at which the reactor 18A is switched from the regeneration process into the reforming process in the fuel cell system 10H.

As shown in FIG. 14, the fuel cell system 10H is common to the fuel cell system 10G according to the sixth embodiment in that a switching device 20H of its hydrogen fuel feeding system 12H is provided with the auxiliary air feeding lines 70A and 70B, air pumps 72A and 72B, and valves V12A and V12B. This eighth embodiment is different from the seventh embodiment, in which the residual regeneration gas is combustion-processed in the reactor 18, in that the exhaust air processors 80A and 80B are disposed at the outside of the reactor 18.

Specifically, according to this embodiment, the as same as in the sixth embodiment, combining parts of the divided feeding lines 78A and 78B shaped as a manifold are connected at the downstream ends of respective auxiliary air feeding lines 70A and 70B, Respective ends of the divided feeding lines 78A and 78B shaped as a manifold are connected at the tubular wall portion of the corresponding reactor 18 to the second ports 18E and 18F end in the axial direction (the fluid flowing direction). Thereby, the fuel cell system 10H is configured so that it is possible to feed the combustion-supporting air approximately evenly to each portion of the second ports 18E and 18F side of each reactor 18 and an air-fuel ratio of each portion of the second ports 18E and 18F side of the reactor 18A can be made to be within a combustion range. A control apparatus 90H of this fuel cell system 10H is operated the same as the control apparatus 90G of the fuel cell system 10G. In addition, the other parts of the configuration of the fuel cell system 10H are the same as the corresponding configurations of the fuel cell system 10. According to this embodiment, the catalyst in the reactor 18 configures the gas for regeneration processor in the present embodiment, together with the auxiliary air feeding lines 70A and 70B, the air pumps 72A and 72B, the divided feeding lines 78A and 78B, and the valves V12A and V12B.

Next, the main parts which are different in operation from the seventh embodiment in the eighth embodiment will be described.

In the fuel cell system 10H according to the eighth embodiment, when the reactor 18A is switched from the regeneration process to the reforming process, the valve 12A is released and the combustion-supporting air is fed to the first reactor 18A. The combustion-supporting air is divided into each portion at the second port 18E end of a center portion in the gas flowing direction of the first reactor 18A, via the auxiliary air feeding line 70A and the divided feeding line 78A, and introduced therein approximately evenly. Then, the residual regeneration gas combusts within the reactor 18A when both of this combustion-supporting air and the residual reforming gas contact the catalyst in the reactor 18A. This combustion gas is pushed by the generated gas of the reforming process started in the first rector 18A from the second port 18E, to be exhausted from the exhaust port 30 via the fuel cell 14 and the second reactor 18B.

Thus, in the fuel cell system 10H, since the residual regeneration gas is combustion-processed at the upstream side of the fuel cell 14 (at the upstream side in the feeding direction of the fuel in the reforming process), the same advantage as the fuel cell system 10G according to the seventh embodiment can be obtained. Since the residual regeneration gas is entirely combusted in the reactors 18, the fuel cell system 10H can be configured without providing the external exhaust air processor 80A and 80B. Further, heat generation due to combustion of the residual regeneration gas can be used for heating of the catalyst of the first reactor 18A and the combustion heat is not discarded to the outside, so that the total efficiency of the fuel cell system 10B is improved.

Ninth Embodiment

Figure 15:
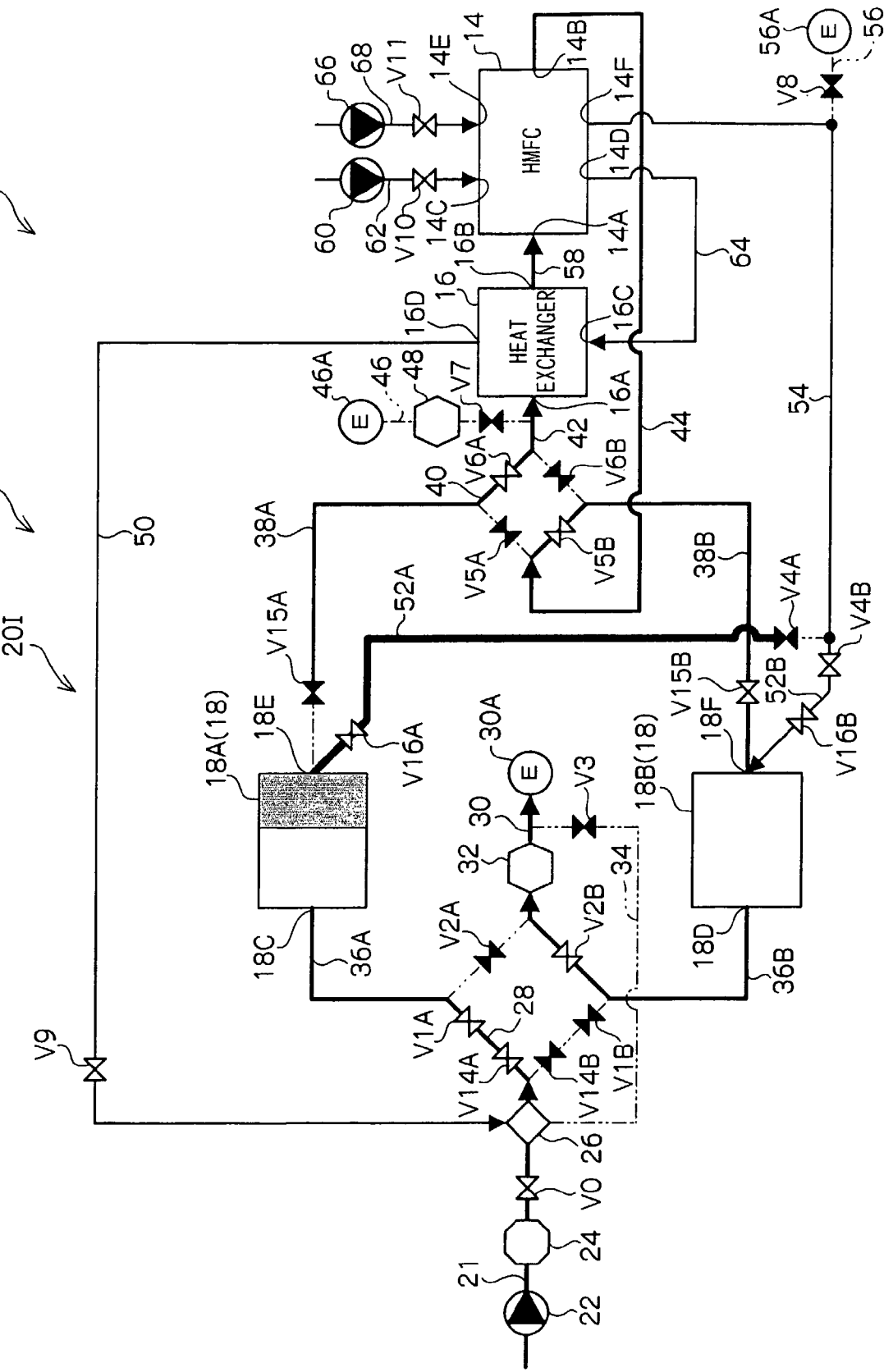
FIG. 15 is a system block diagram of the fuel cell system according to a ninth embodiment of the present invention.
Figure 16:
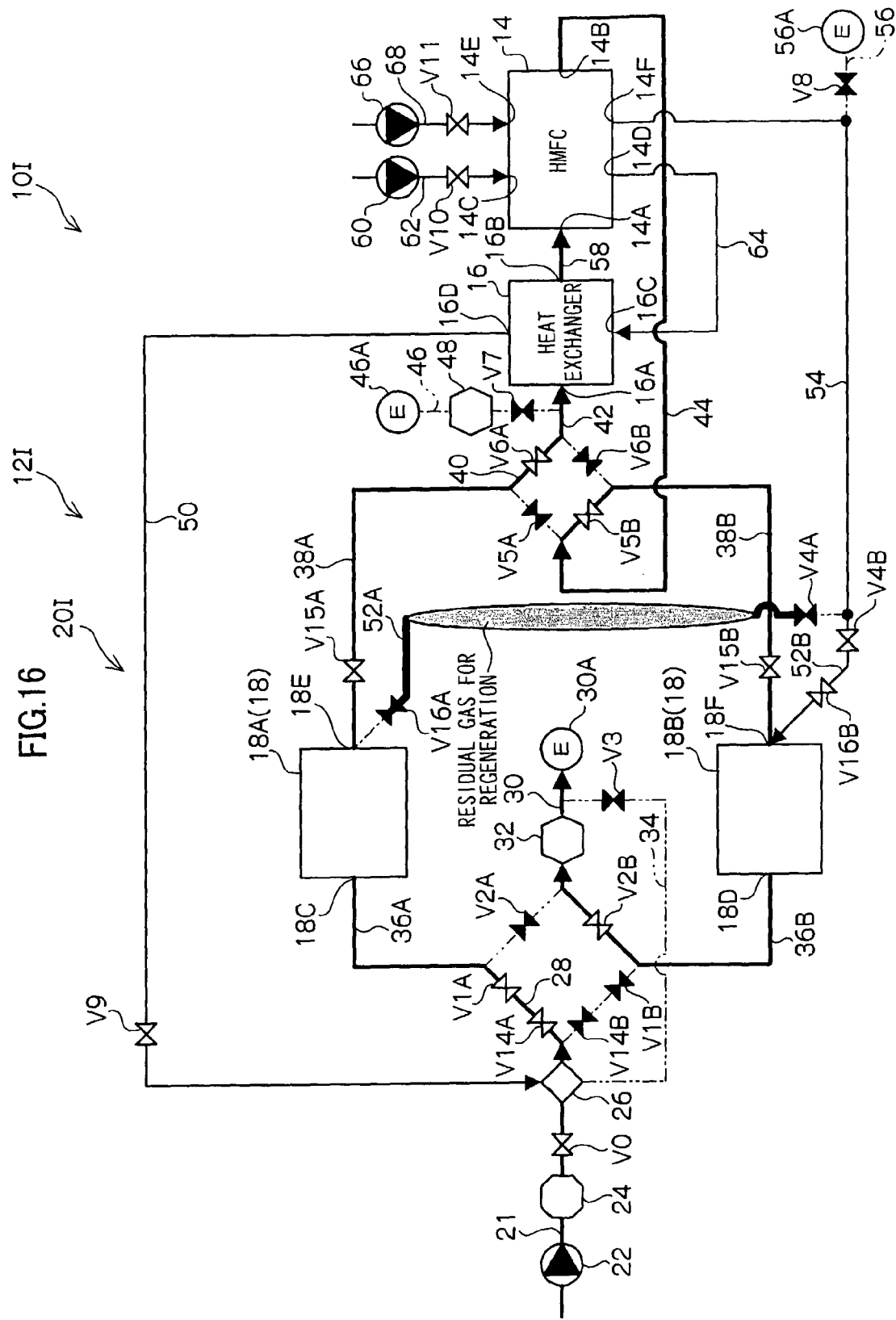
FIG. 16 is a system block diagram of the other status of the fuel cell system according to the ninth embodiment of the present invention.

FIG. 15 and FIG. 16 illustrate a fuel cell system 10I according to the ninth embodiment. Further, FIG. 15 show the status at which the reactor 18A is switched from the regeneration process into the reforming process, and FIG. 16 shows the state after the reactor 18A is switched into the reforming process.

As shown in FIG. 15 and FIG. 16, a hydrogen fuel feeding system 12I configuring a fuel cell system 10I is provided with a switching device 20I. The switching device 20I is provided with all the components of the switching device 20 and further, it is provided with the valve V15A disposed on the third line 38A, the valve V15B disposed on the fourth line 38B, the valve V16A disposed between the valve V4A on the combustion air feeding line 52A and the reactor 18A, and the valve V16B disposed between the valve V4B on the combustion air feeding line 52B and the reactor 18B. In addition, the fuel cell system 10I is provided with the valves V14A and V14B, the as same as the fuel cell system 10E according to the fifth embodiment. When the reactor 18 is switched from the reforming process into the regeneration process, the control apparatus carries out the same operations as in the fifth embodiment.

The control apparatus 90I of this fuel cell system 10I is able to close the valve V15A while maintaining the open status of the valve V16A when the valves V1A and V14A are opened, the valve V14A is closed, and the first reactor 18A is switched from the regeneration process into the reforming process. Then, after the elapse of a predetermined period of time from opening of the valve V1A, the control apparatus 90I closes the valve V16A and opens the valve V15A, and switches the first reactor 18A into the reforming process completely. In addition, when the valves V1B and V14B are opened together and the valve V4B is closed and the second reactor 18B is switched from the regeneration process to the reforming process, this control apparatus is able to close the valve V15B while maintaining the open status of the valve V16 and after an elapse of a predetermined period of time from opening the valve V1B, the control apparatus closes the valve V16B and opens the valve V15B, and switches the second reactor 18B into the reforming process completely. The control operation of the control apparatus 90I will be complemented by the explanation of the operation of the present embodiment to be described later.

The other parts of the configuration of the fuel cell system 10I are the same as the corresponding configurations of the fuel cell system 10. According to this embodiment, the combustion air feeding lines 52A and 52B are equivalent to the oxygen introducing line of the present invention and they configure a residual regeneration gas space together with the valves V4A, V16A; and the valves V4B and V16B.

Next, the operation of the ninth embodiment will be described.

In the fuel cell system 10I according to the ninth embodiment, when the reactor 18A is switched from the regeneration process to the reforming process, the residual regeneration gas remains in the reactor 18A. Then, when the first reactor 18A as shown in FIG. 6 is switched from the status of performing the regeneration process (namely, the status at which V15A, V15B, and V16A are open and V16B is closed) into the status shown in FIG. 15 by closing the valves V1B, V4A, V5A, V6B, V14B, and V15A and opening the valves V1A, V2B, V4B, V5B, V6A, V14A, and V16B, the reforming process is started in the first reactor 18A and further, the regeneration process is started in the second reactor 18B.

In this time, since the third line 38A is closed by the valve V15A, the residual regeneration gas pushed out from the second port 18E, by the fuel gas generated in the reforming process of the first reactor 18A, is pushed under compression into the combustion air feeding line 52A closed by the valve V4A. After the elapse of a predetermined period of time required for pushing the residual regeneration gas between the valve V4A and V16A on the combustion air feeding line 52A, the valve V16A is closed. Thereby, as shown in FIG. 16, the residual regeneration gas is kept between the valve V4A and the valve V16A. In other words, the residual regeneration gas is temporarily contained in the line that is not being used at that time. Approximately simultaneously with the closing of the valve V16A, the valve V15A is released and the process shifts to the normal process in which the fuel gas generated in the reforming configuration is fed to the fuel cell 14.

Then, when the first reactor 18A is switched from the reforming process into the regeneration process the next time, both of the valves V4A and V16A are opened and the residual regeneration gas temporarily contained in the combustion air feeding line 52A is pushed out by the air for cooling, after cooling the fuel cell 14, to be introduced into the first reactor 18A. In other words, the residual regeneration gas that has been temporarily contained is returned to the first reactor 18A, a part thereof is reused as the regeneration fuel, and a part of the remaining gas is exhausted from the exhaust line 30 to the outside of the system together with the combustion gas after being reused passing through the first reactor 18A. Thus, by temporarily evacuating the residual regeneration gas and using or processing it in the next regeneration process, the residual regeneration gas containing the combustible gas is prevented from being introduced into the fuel cell 14. Therefore, it is prevented or refrained that the component member of the fuel cell 14 is damaged by heat generation of the residual regeneration gas due to oxidation in the vicinity of the fuel gas inlet 14A. In addition, in the fuel cell system 10I, the combustible components of the residual regeneration gas are used as the fuel for the next regeneration process, namely, the regeneration fuel is not discarded to the outside without being combusted, so that the total efficiency of the fuel cell system 10I is improved.

Further, in the ninth embodiment, an example in which the residual regeneration gas is temporarily contained in the combustion air feeding lines 52A and 52B is shown, however, the present invention is not limited to this. For example, an accumulator or the like for temporarily containing the residual reforming gas may be connected between the valve V4A and the valve V15A. In addition, according to the ninth embodiment, an example in which the valves V14A and V14B are provided is shown, however, it is obvious that these valves V14A and V14B need not be provided.

Tenth Embodiment

Figure 17:
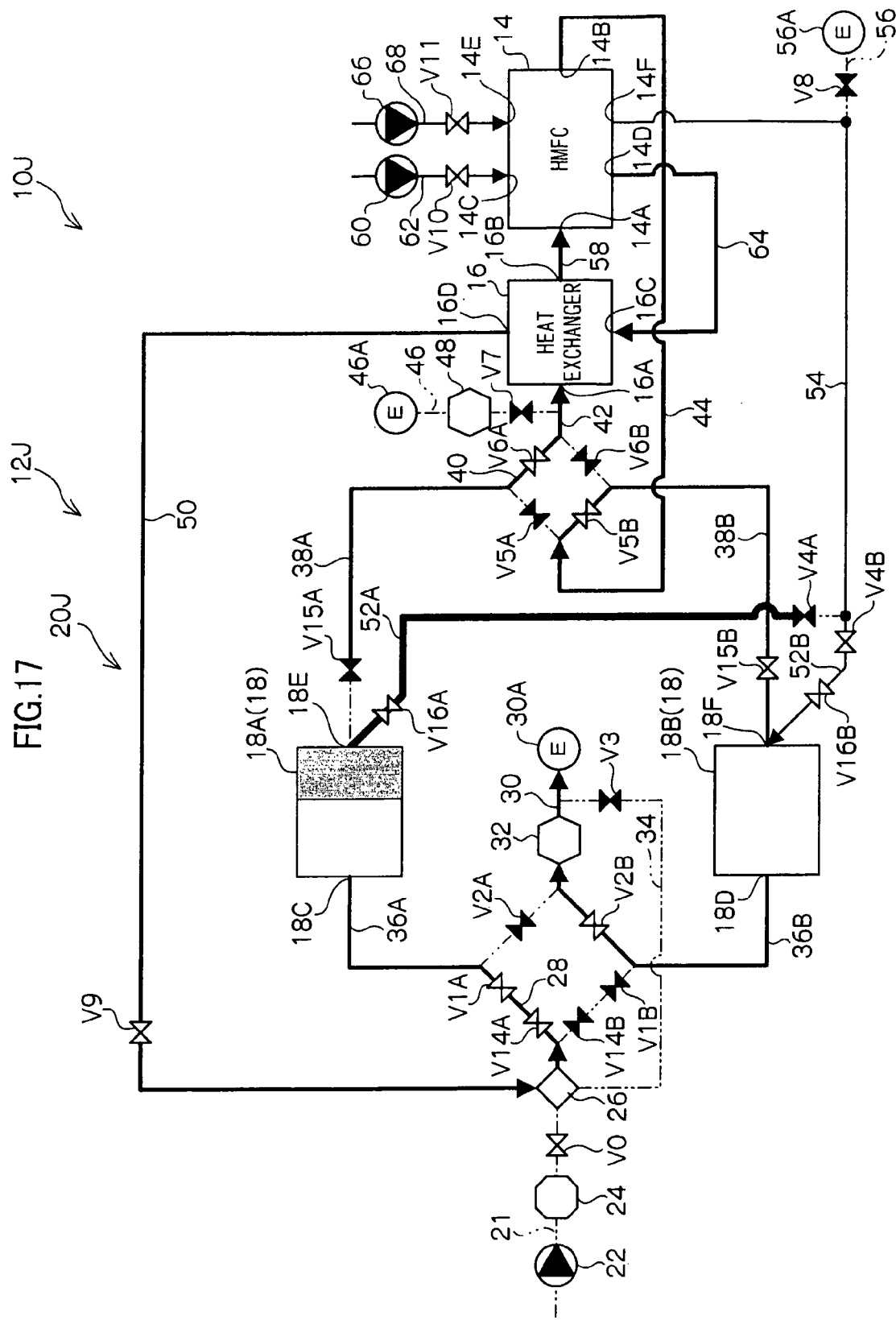
FIG. 17 is a system block diagram of the fuel cell system according to a tenth embodiment of the present invention.

FIG. 17 illustrates a fuel cell system 10J according to the tenth embodiment. Further, FIG. 17 shows the status at which the reactor 18A is switched from the regeneration process into the reforming process in the fuel cell system 10J.

As shown in FIG. 17, in the fuel cell system 10J, the mechanical configuration of a switching device 20J of its hydrogen fuel feeding system 12J is entirely the same as the switching device 20I of the fuel cell system 10I. A control apparatus 90J of the fuel cell system 10J closes the valve V15A and further, closes the valve V0 while maintaining the open status of the valve V16A when the first reactor 18A is switched from the regeneration process into the reforming process, by opening the valves V1A and V14A and closing the valve V4A. Then, after the elapse of a predetermined period of time from closing of the valve V0, the control apparatus 90J closes the valve V16A and opens the valve V0 and the valve V15A so as to completely switch the first reactor 18A into the reforming process. In addition, the control apparatus 90J closes the valves V15B and V0 while maintaining the open status of the valve V16B when the second reactor 18B is switched from the regeneration process to the reforming process, by releasing the valves V1B and V14B and closing the valve V4B. Then, after the elapse of a predetermined period of time from closing of the valve V0, the control apparatus 90J closes the valve V16B and opens the valve V15B so as to completely switch the second reactor 18B into the reforming process. The control operation of the control apparatus will be complemented by the explanation about the operation of the present embodiment to be described later. The other parts of the configuration of the fuel cell system 10J are the same as the corresponding configuration of the fuel cell system 10.

Next, the main parts that are different from the ninth embodiment in the operation of the tenth embodiment will be described.

In the fuel cell system 10J according to the tenth embodiment, when the reactor 18A is switched from the regeneration process into the reforming process, the residual regeneration gas remains in the reactor 18A. Then, when the first reactor 18A as shown in FIG. 5 is switched from the status of performing the reforming process (namely, the status at which V15A, V15B, and V16A are open and V16B is closed) into the status shown in FIG. 17, by closing the valves V0, V1B, V4A, V5A, V6B, V14B, and V15A and opening the valves V2B, V4B, V5B, V6A, V14A, and V16B. Then, feeding of the hydrocarbon reactant to the hydrogen fuel feeding system 12J is stopped and the cathode-off gas as air containing steam is fed from the mixer 26 to the first reactor 18A.

The residual regeneration gas pushed out from the second port 18E by this cathode-off gas is pushed under compression into the combustion air feeding line 52A on which the valve V4A is closed, and the residual regeneration gas is trapped between the valve V4A and the valve V16A, the same as the status shown in FIG. 16, by closing the valve V16A after the elapse of a predetermined period of time. Approximately as same time as closing of the valve V16A, the valve V0 and the valve V15A are released, the first reactor 18A to which the reforming reaction gas is fed shifts to the reforming process so as to feed the fuel gas generated in the reforming process to the fuel cell 14. In other words, the fuel cell system 10J is different from the fuel cell system 10I according to the ninth embodiment only in that the compression source for pushing the residual regeneration gas in the combustion air feeding lines 52A and 52B is not the fuel gas generated in the regeneration process but the cathode-off gas (the purge gas). Accordingly, the residual regeneration gas temporarily contained in the combustion air feeding line 52A is used or processed in the next regeneration process.

According to the fuel cell system 10J according to the present embodiment, the same advantages as the fuel cell system 10I according to the ninth embodiment can also be obtained. In addition, in the fuel cell system 10J, the fuel gas containing hydrogen generated by reforming is combusted in the next regeneration process by evacuating the fuel gas into the combustion air feeding line 52A, namely, without consuming hydrogen in the fuel cell 14, so that the fuel cell system 10J is stably operated in total. Also, it is possible to provide, for example, a bypass line communicating the steam feeding line 50 with the gas for regeneration introduction line 44 as the compression source, in place of the fuel gas or the cathode-off gas generated in the reforming process, for pushing the residual regeneration gas in the combustion air feeding lines 52A and 52B, with steam or air or the like introduced into the first reactor 18A through this bypass line, the bridge conduit 40, and the third line 38A.

Eleventh Embodiment

Figure 18:
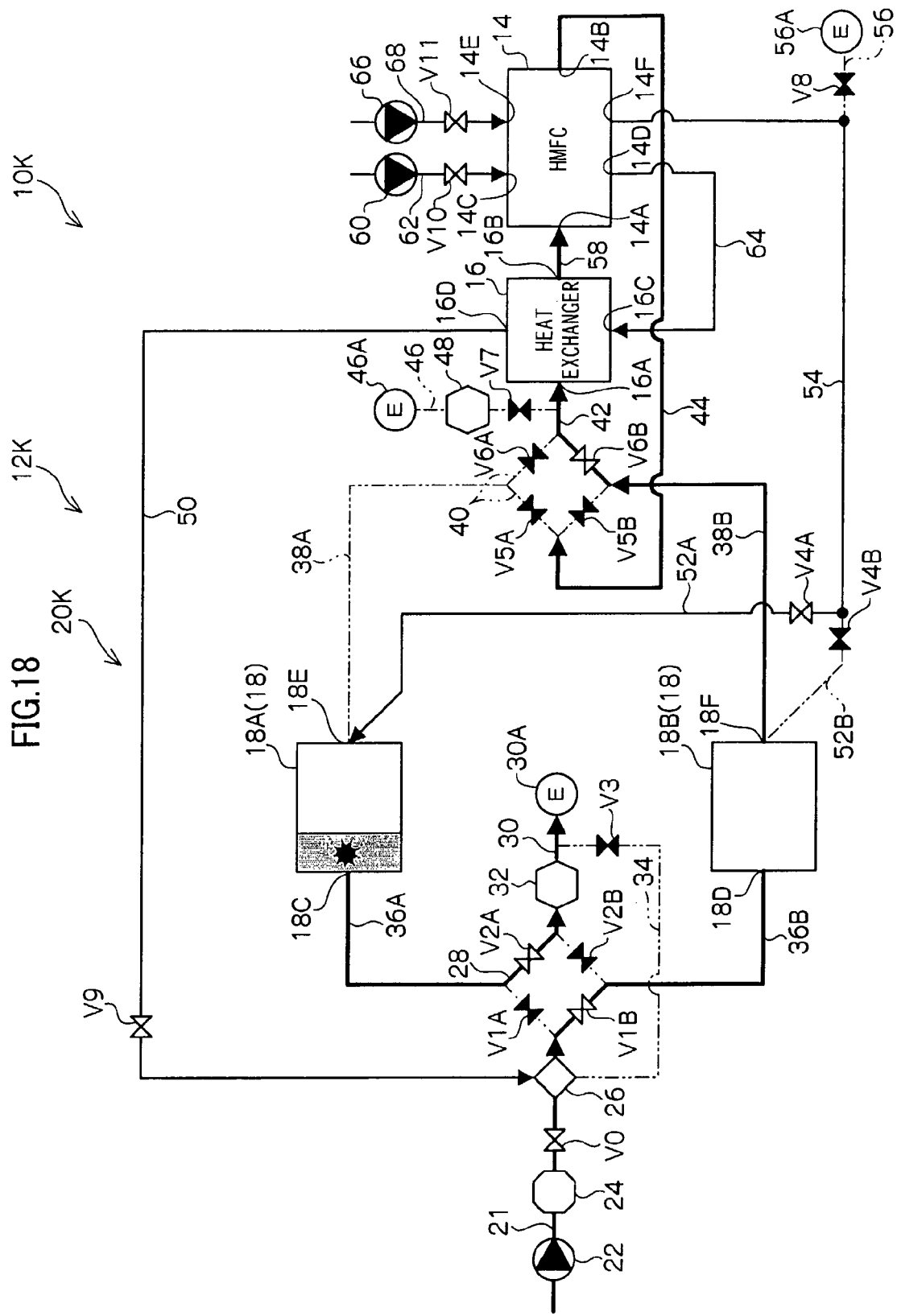
FIG. 18 is a system block diagram of the fuel cell system according to an eleventh embodiment of the present invention.

FIG. 18 illustrates a fuel cell system 10K according to the eleventh embodiment. Further, FIG. 18 shows the status before the reactor 18A is switched from the regeneration process into the reforming process in the fuel cell system 10K.

As shown in FIG. 18, the mechanical configuration of the fuel cell system 10K is configured entirely the same as the basic configuration of the fuel cell system 10. In other words, in the fuel cell system 10K, a switching device 20K of a hydrogen fuel feeding system 12K is configured mechanically the same as the switching device 20 and it is characterized by the switching control when the reactor 18 is switched from the regeneration process into the reforming process. Specifically, in the fuel cell system 10K, a control apparatus 90K closes the valve V5A before the second reactor 18B finishes the reforming process. In other words, this control apparatus 90K is configured so as to stop the feeding of the gas for regeneration (the anode-off gas as the fuel) to the first reactor 18A carrying out the regeneration process before the second reactor 18B finishes the reforming process. In the same way, this control apparatus 90K closes the valve V5B before the first reactor 118A finishes the reforming process.

Next, the operation of the eleventh embodiment will be described.

In the fuel cell system 10K according to the eleventh embodiment, before the first reactor 18A is switched from the regeneration process to the reforming process, namely, from the status at which the first reactor 18A shown in FIG. 6 carries out the regeneration process and the second reactor 18B carries out the reforming process (last stage), the valve V5A is closed as shown in FIG. 18. Then, feeding of the gas for regeneration to the first reactor 18A is stopped, however, feeding of combustion-supporting air from the combustion air feeding line 52A has been maintained. Therefore, the gas for regeneration remaining in the first reactor 18A at this time is combust, contacting the catalyst of the first reactor 18A together with combustion-supporting air. This combustion gas is pushed out from the first port 18C by the air fed from the combustion air feeding line 52A, to be exhausted to outside of the system through the exhaust line 30.

After that (for example, after the elapse of a predetermined period of time from closing of the valve V5A), closing the valves V1B, V4A, V6B, and V14B and releasing the valves V1A, V2B, V4B, V5B, V6A, and V14A, the first reactor 18A starts the reforming process and further, the second reactor 18B starts the regeneration process. At this point, the first reactor 18A is mainly filled with air fed from the combustion air feeding line 52A and there is little gas for regeneration containing the combustible gases. Therefore, the combustible gas is prevented from being introduced into the fuel cell 14 and damage by heat generation of the residual regeneration gas the component member of the fuel cell 14 by oxidation in the vicinity of the fuel gas inlet 14A is prevented or restricted. In addition, for example, as compared with the configuration in which a bypass channel is provided, so as to prevent the residual regeneration gas from passing through the fuel cell 14, the configuration and the control of the present embodiment can be simplified.

Generally, the time required for regeneration of the reactor 18 is shorter than the time it is possible to maintain the reforming reaction by the reactor 18, so that the control according to the present embodiment can be realized.

Twelfth Embodiment

Figure 19:
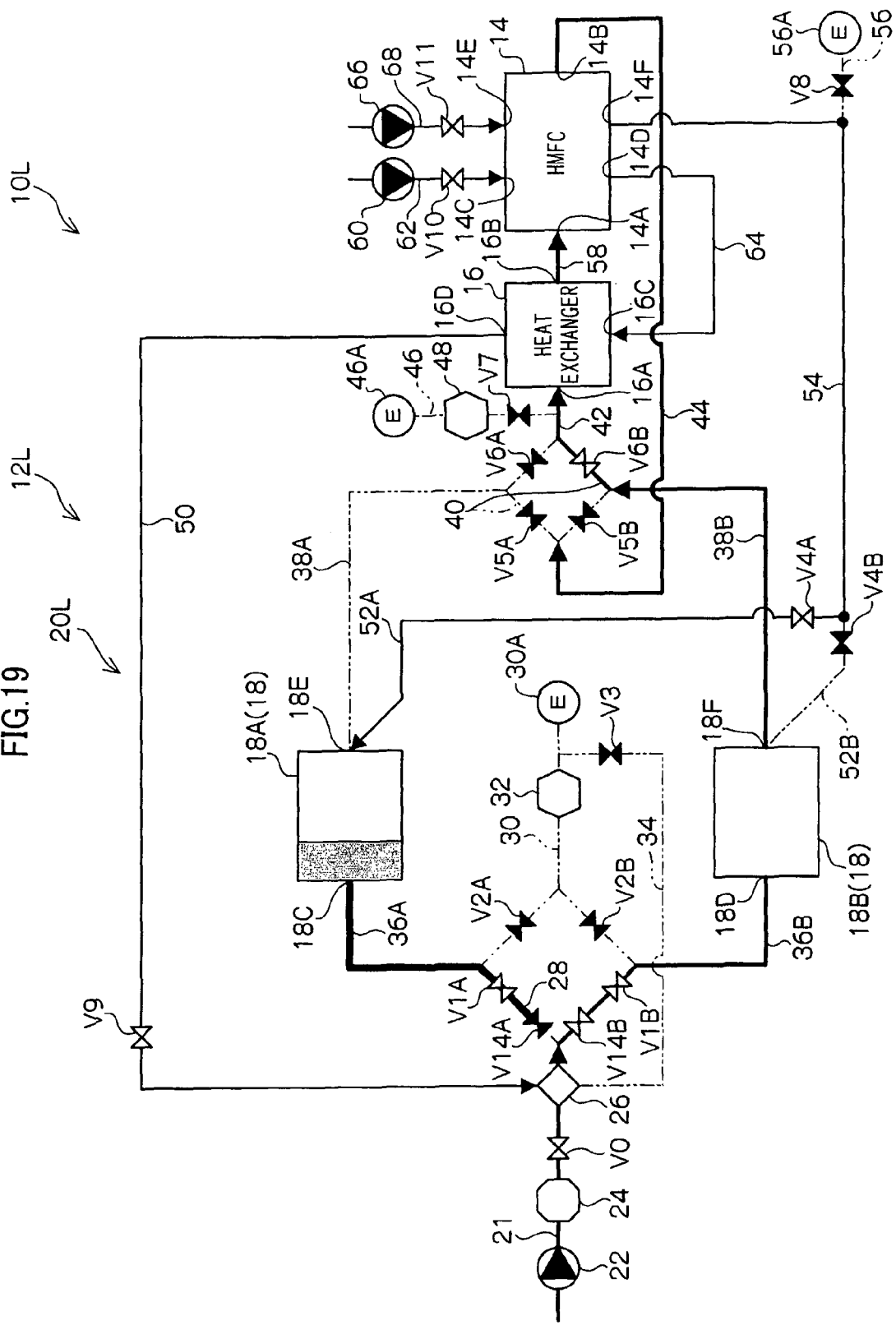
FIG. 19 is a system block diagram of the fuel cell system according to a twelfth embodiment of the present invention.
Figure 20:
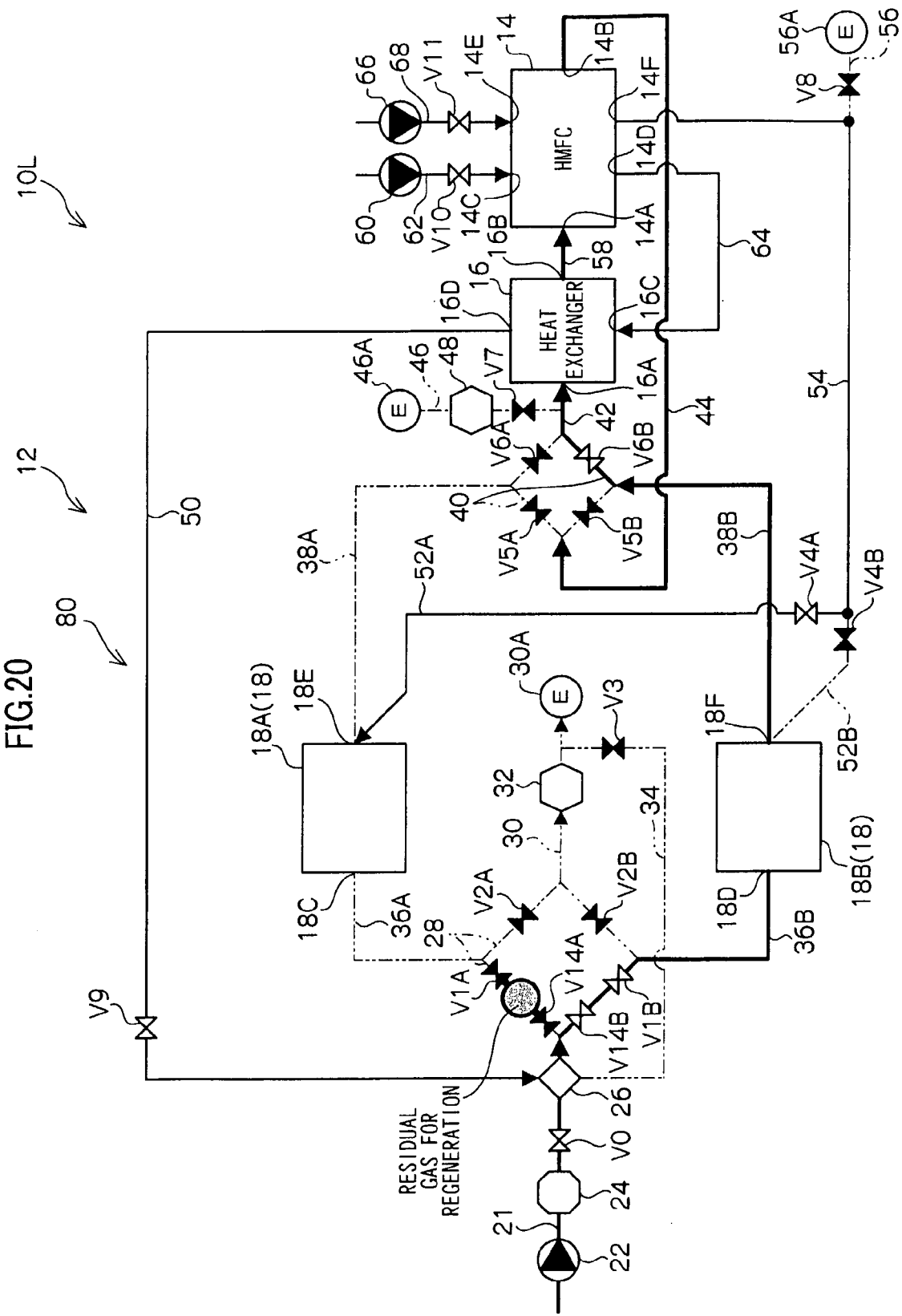
FIG. 20 is a system block diagram of the other status of the fuel cell system according to the twelfth embodiment of the present invention.

FIG. 19 and FIG. 20 illustrate a fuel cell system 10L according to the twelfth embodiment. Further, FIG. 19 and FIG. 20 show the status at which the reactor 18A is switched from the regeneration process to the reforming process in the fuel cell system 10L.

As shown in FIG. 19 and FIG. 20, in the fuel cell system 10L, a switching device 20L of a hydrogen fuel feeding system 12L is mechanically configured entirely the same as the switching device 20E of the fuel cell system 10E. In the fuel cell system 10L, a control apparatus 90L closes the valves V2A and V5A and opens the valve V1A before the second reactor 18B finishes the reforming process. In other words, this control apparatus 90L is configured so as to stop feeding of the gas for regeneration to the first reactor 18A carrying out the regeneration process before the second reactor 18B finishes the reforming process and to temporarily contain the gas for regeneration that has not been combust in the bridge conduit 28, in order to prevent the gas for regeneration from being released outside of the system. In the same way, this control apparatus 90L closes the valves V2B and V5B and opens the valve V1B before the first reactor 18A finishes the reforming process.

The other parts of the configuration of the fuel cell system 10L are the same as the corresponding configuration of the fuel cell system 10. According to this embodiment, the configuration between the material feeding line 21 for distributing the reforming reaction gas in the bridge conduit 28 and the first lines 36A and 36B is equivalent to the material feeding line of the present invention and configures a regeneration gas processing unit together with the valves V1A, V14A and the valves V1B and V14B. In addition, the space sandwiched by the valves V1A and V14A and the space sandwiched by the valves V1B and V14B are each equivalent to a gas for regeneration space.

Next, the operation of the twelfth embodiment will be described.

In the fuel cell system 10L according to the twelfth embodiment, before the first reactor 18A is switched from the regeneration process to the reforming process, namely, from the status shown in FIG. 6 in which the first reactor 18A carries out the regeneration process and the second reactor 18B carries out the reforming process (last stage), the valves V2A and V5A are closed as shown in FIG. 19, and the valve V1A is opened while maintaining the closed status of the valve 14A. Then, feeding of the gas for regeneration to the first reactor 18A is stopped, however, feeding of combustion-supporting air from the combustion air feeding line 52A is maintained. Therefore, the gas for regeneration remaining in the first reactor 18A at this time is pushed out from the first port 18C by the air fed from the combustion air feeding line 52A to be pushed under compression into the valve V14A on the bridge conduit 28. After the elapse of a period of time required for pushing the gas for regeneration between the valve V14A and the valve V1A on the bridge conduit 28, the valve V1A is closed. Thereby, as shown in FIG. 20, the gas for regeneration is trapped between the valve V1A and the valve V14A, In other words, the residual reforming gas is temporarily contained in a line that is not being used at that time.

After closing the valve V1A, closing the valves V1B, V4A, V6B, and V14B and opening the valves V1A, V2B, V4B, V5B, V6A, and V14A, the first reactor 18A starts the reforming process and further, the second reactor 18B starts the regeneration process. At this point, the first reactor 18A is mainly filled with the air fed from the combustion air feeding line 52A and little of the combustible gas for regeneration remains. Then, the gas for regeneration evacuated between the valve V1A and the valve V14A is pushed by the reforming reaction gas from the mixer 26 to be introduced again into the first reactor 18A, be diluted by the fuel gas generated in the reforming process, and be fed to the fuel cell 14.

Thereby, when the regeneration process is switched to the reforming process deterioration of the fuel cell 14, by the gas for regeneration (carbon monoxide) that has not been combust, it is prevented. In addition, in this configuration, as compared for example with a configuration with a bypass channel provided in order to prevent the residual regeneration gas from passing through the fuel cell 14, the configuration and the control according to the present embodiment can be simplified.

Further, with respect to each of the above-described embodiments, the processing of the residual reforming gas when shifting from the reforming process into the regeneration process and the processing of the residual regeneration gas or the gas for regeneration when shifting from the regeneration process into the reforming process are separately explained. However, each of the above-described embodiments is allowed to be configured so that both processing of the residual reforming gas and processing of the residual regeneration gas are carried out, by appropriately combining the configurations from the fuel cell systems 10A to 10E, and the configurations from the fuel cell systems 10F to 10L.

The disclosure of Japanese Patent Application No. 2005-104634 from which this application claims priority is incorporated by reference herein.

The invention claimed is:

1. A hydrogen fuel feeding system comprising:
    two reactors configured to be switched so as to carry out a reforming process for generating a fuel gas containing hydrogen from a reactant and a regeneration process for raising to a temperature at which a reforming reaction can be performed the temperature within the reactor, which was lowered by the reforming process, by reacting a fed gas for regeneration;

a switching device that switched to configure alternate statuses of a first status of feeding the reactant to the reactor while exhausting the fuel gas and a second status of feeding the gas for regeneration to the reactor while exhausting a regeneration exhaust gas, wherein the switching device comprises a residual reforming gas feeding line that communicates a regeneration exhaust gas channel with a gas for a regeneration feeding line, and wherein the switching device switches the two reactors between the first status and the second status and the residual reforming gas feeding line can communicates the regeneration exhaust gas channel of one reactor with the gas for the regeneration feeding line of the other reactor; and a control apparatus programmed to switch the switching device so that when switching from the first status to the second status residual reforming gas remaining in the reactor before switching is not exhausted without treatment, wherein the control apparatus closes the regeneration exhaust gas channel and opens the residual reforming gas feeding line when switching from the first status to the second status, and wherein the control apparatus switches the switching device so that when one of the reactors is in the first status the other of the reactors is in the second status and when switching the one reactor from the first status to the second status, the control apparatus maintains the second status of the other reactor while closing the regeneration exhaust gas channel of the one reactor and opening the residual reforming gas feeding line of the one reactor.

2. The hydrogen fuel feeding system according to claim 1, wherein the control apparatus switches the switching device so that the residual reforming gas is oxidation-processed in the reactor or in a channel of the regeneration exhaust gas.

3. The hydrogen fuel feeding system according to claim 1, wherein:
in the first status the selecting device is configured to feed to the reactor a reactant for regeneration and the gas for regeneration; and,
the control apparatus stops the feeding of the reforming reactant to the reactor before the first status is switched to the second status and switches the switching device so that the residual reforming gas remaining in the reactor is fed to the feeding destination of the fuel gas by the gas for reforming.

4. The hydrogen fuel feeding system according to claim 1, wherein:
the switching device further comprises a residual reforming gas space into which the residual reforming gas can be introduced and held; and
when switching from the first status to the second status the control apparatus switches the switching device so that the residual reforming gas is introduced and held in the residual reforming gas space by a purge gas introduced into the reactor, and when switching from the second status to the first status the residual reforming gas is released from the residual reforming gas space and fed to the reactor together with the reforming reactant.

5. The hydrogen fuel feeding system according to claim 4, wherein the residual reforming gas space is configured by disposing a pair of opening and closing valves on a reactant feeding line for feeding the reforming process reactant to the reactor carrying out the reforming process.

6. The hydrogen fuel feeding system according to claim 1, wherein when switching the second status into the first status the control apparatus switches the switching device so that the residual regeneration gas contacts a reforming catalyst in the reactor, or an oxidation catalyst disposed in a feeding line to the feeding destination of the fuel gas, together with oxygen.

7. The hydrogen fuel feeding system according to claim 6, wherein the reforming catalyst in the reactor or the oxidation catalyst disposed in the feeding line of the fuel gas is configured including cerium oxide.

8. The hydrogen fuel feeding system according to claim 1, wherein:
the switching device further comprises a residual regeneration gas space into which the residual regeneration gas is introduced and held; and
when switching the second status into the first status the control apparatus switches the switching device so that the residual regeneration gas is introduced and held in the residual regeneration gas space by a purge gas introduced into the reactor; and when the reactor carries out the next regeneration process the residual regeneration gas is released from the residual regeneration gas temporary chamber to be used by the regeneration process.

9. The hydrogen fuel feeding system according to claim 8, wherein the residual regeneration gas space is configured by disposing a pair of opening and closing valves on an oxygen introduction line for introducing oxygen to be reacted with the gas for regeneration into the reactor carrying out the regeneration process.

10. The hydrogen fuel feeding system according to claim 1, wherein the control apparatus stops the feeding of the gas for regeneration to the reactor before switching from the second status into the first status; and the control apparatus switches the switching device so as to maintain the feeding of a gas containing oxygen to be reacted with the gas for regeneration to the reactor and to ensure there is time for reacting the residual regeneration gas of the reactor with the gas containing oxygen.

11. The hydrogen fuel feeding system according to claim 1, wherein:
the switching device comprises a gas for regeneration space into which the residual regeneration gas can be introduced and held;
the control apparatus stops the feeding of the gas for regeneration to the reactor before switching from the second status to the first status;
and during a period that feeding of the gas for regeneration to the reactor has been stopped the control apparatus switches the switching device so that the residual regeneration gas is introduced and held in the residual regeneration gas space by a purge gas introduced into the reactor, and when the reactor is carrying out the next regeneration process or the next reforming process the residual regeneration gas is released from the residual regeneration gas temporary chamber to be introduced into the reactor.

12. The hydrogen fuel feeding system according to claim 11, wherein the purge gas is introduced from the outlet of the fuel generated in the reforming process in the reactor; and
the gas for regeneration space is configured by arranging a pair of opening and closing valves on a reactant feeding line for feeding the reactant to the reactor for carrying out the reforming process.

13. A fuel cell system comprising: the hydrogen fuel feeding system according to claim 1; and a fuel cell for consuming hydrogen gas in the fuel gas generated by the hydrogen fuel feeding system in the reforming process and generating electric power, wherein the fuel cell system uses exhaust fuel gas that is exhausted from the fuel cell as the gas for regeneration.

14. A fuel cell system comprising: the hydrogen fuel feeding system according to claim 2; and a fuel cell for consuming hydrogen gas in the fuel gas generated by the hydrogen fuel feeding system in the reforming process and generating electric power, wherein the fuel cell system uses exhaust fuel gas that is exhausted from the fuel cell as the gas for regeneration.

15. A fuel cell system comprising: the hydrogen fuel feeding system according to claim 3; and a fuel cell for consuming hydrogen gas in the fuel gas generated by the hydrogen fuel feeding system in the reforming process and generating electric power, wherein the fuel cell system uses exhaust fuel gas that is exhausted from the fuel cell as the gas for regeneration.

16. A fuel cell system comprising: the hydrogen fuel feeding system according to claim 4; and a fuel cell for consuming hydrogen gas in the fuel gas generated by the hydrogen fuel feeding system in the reforming process and generating electric power, wherein the fuel cell system uses exhaust fuel gas that is exhausted from the fuel cell as the gas for regeneration.

17. A fuel cell system comprising: the hydrogen fuel feeding system according to claim 5; and a fuel cell for consuming hydrogen gas in the fuel gases generated by the hydrogen fuel feeding system in the reforming process and generating electric power, wherein the fuel cell system uses exhaust fuel gas that is exhausted from the fuel cell as the gas for regeneration.

18. A fuel cell system comprising: the hydrogen fuel feeding system according to claim 6; and a fuel cell for consuming hydrogen gas in the fuel gas generated by the hydrogen fuel feeding system in the reforming process and generating electric power, wherein the fuel cell system uses exhaust fuel gas that is exhausted from the fuel cell as the gas for regeneration.

19. A fuel cell system comprising: the hydrogen fuel feeding system according to claim 7; and a fuel cell for consuming hydrogen gas in the fuel gas generated by the hydrogen fuel feeding system in the reforming process and generating electric power, wherein the fuel cell system uses exhaust fuel gas that is exhausted from the fuel cell as the gas for regeneration.

20. A fuel cell system comprising: the hydrogen fuel feeding system according to claim 8; and a fuel cell for consuming hydrogen gas in the fuel gases generated by the hydrogen fuel feeding system in the reforming process and generating electric power, wherein the fuel cell system uses exhaust fuel gas that is exhausted from the fuel cell as the gas for regeneration.

21. A fuel cell system comprising: the hydrogen fuel feeding system according to claim 9; and a fuel cell that consumes hydrogen gas in the fuel gases generated by the hydrogen fuel feeding system in the reforming process and generating electric power, wherein the fuel cell system uses exhaust fuel gas that is exhausted from the fuel cell as the gas for regeneration.

22. A fuel cell system comprising: the hydrogen fuel feeding system according to claim 10; and a fuel cell that consumes hydrogen gas in the fuel gases generated by the hydrogen fuel feeding system in the reforming process and generating electric power, wherein the fuel cell system uses exhaust fuel gas that is exhausted from the fuel cell as the gas for regeneration.

23. A fuel cell system comprising: the hydrogen fuel feeding system according to claim 11; and a fuel cell that consumes hydrogen gas in the fuel gases generated by the hydrogen fuel feeding system in the reforming process and generating electric power, wherein the fuel cell system uses exhaust fuel gas that is exhausted from the fuel cell as the gas for regeneration.

24. A fuel cell system comprising the hydrogen fuel feeding system according to claim 12; and a fuel cell that consumes hydrogen gas in the fuel gases generated by the hydrogen fuel feeding system in the reforming process and generating electric power, wherein the fuel cell system uses exhaust fuel gas that is exhausted from the fuel cell as the gas for regeneration.

\* \* \* \* \*